(12) United States Patent
Wright et al.

(10) Patent No.: US 10,924,415 B2
(45) Date of Patent: Feb. 16, 2021

(54) DEVICE SHAPING IN A COMMUNICATIONS NETWORK

(71) Applicant: VIASAT, INC., Carlsbad, CA (US)

(72) Inventors: Sheridan Wright, Vancouver, WA (US); Bakul Khanna, Lexington, MA (US)

(73) Assignee: VIASAT, INC., Carlsbad, CA (US)

( * ) Notice: Subject to any disclaimer, the term of this patent is extended or adjusted under 35 U.S.C. 154(b) by 59 days.

(21) Appl. No.: 16/326,675

(22) PCT Filed: Aug. 11, 2017

(86) PCT No.: PCT/US2017/046506
§ 371 (c)(1),
(2) Date: Feb. 19, 2019

(87) PCT Pub. No.: WO2018/038939
PCT Pub. Date: Mar. 1, 2018

(65) Prior Publication Data
US 2019/0190837 A1 Jun. 20, 2019

Related U.S. Application Data

(60) Provisional application No. 62/379,055, filed on Aug. 24, 2016.

(51) Int. Cl.
*H04L 12/813* (2013.01)
*H04L 12/815* (2013.01)
(Continued)

(52) U.S. Cl.
CPC ............ *H04L 47/20* (2013.01); *H04L 45/38* (2013.01); *H04L 47/22* (2013.01); *H04L 47/263* (2013.01);
(Continued)

(58) Field of Classification Search
None
See application file for complete search history.

(56) References Cited

U.S. PATENT DOCUMENTS

| 7,010,611 B1 | 3/2006 | Wiryaman et al. |
| 7,990,864 B2 | 8/2011 | Xu |

(Continued)

FOREIGN PATENT DOCUMENTS

| EP | 1258114 A1 | 11/2002 |
| WO | WO 2018/038939 A1 | 3/2018 |

OTHER PUBLICATIONS

Cisco Meraki, "SD-WAN and Traffic Shaping", https://documentation.meraki.com/MX-Z/Firewall_and_Traffic_Shaping/Traffic_Shaping_Settings, Article ID: 4366, retrieved on Aug. 12, 2016, 2 pgs.

(Continued)

*Primary Examiner* — Peter Chen
(74) *Attorney, Agent, or Firm* — Chang & Hale LLP

(57) ABSTRACT

Embodiments provide techniques for device-level traffic shaping in a communications network. Embodiments operate in communication networks providing connectivity to large numbers of user-side network nodes via shared communications links. For example, customer premises equipment (CPE) devices behind one of the user-side network nodes are classified into device types according to a predetermined rate-relevant characteristic of the CPE device. Upon receiving a forward-link (FL) traffic flow destined for one of the CPE devices, the device type of the CPE device is identified, and the FL traffic flow is shaped in accordance with a traffic shaping policy that corresponds to CPE device type. Various embodiments are tailored to support architectures having device-level shapers and/or network address translators (NAT) in user-side network nodes and/or in a provider-side network node.

17 Claims, 11 Drawing Sheets

(51) Int. Cl.
*H04W 28/02* (2009.01)
*H04L 12/825* (2013.01)
*H04L 12/721* (2013.01)
*H04L 29/12* (2006.01)
*H04B 7/185* (2006.01)
*H04L 12/801* (2013.01)

(52) U.S. Cl.
CPC ....... *H04L 61/256* (2013.01); *H04W 28/0215* (2013.01); *H04B 7/18595* (2013.01); *H04L 47/14* (2013.01)

(56) References Cited

U.S. PATENT DOCUMENTS

| | | | |
|---|---|---|---|
| 8,432,808 | B1 | 4/2013 | Dankberg |
| 8,537,676 | B1 | 9/2013 | Apte et al. |
| 8,989,818 | B2 | 3/2015 | Tal et al. |
| 9,071,526 | B2 | 6/2015 | Avdanin et al. |
| 9,276,665 | B1 | 3/2016 | Johnson |
| 9,391,749 | B2 | 7/2016 | Amanna, III et al. |
| 2003/0147349 | A1 | 8/2003 | Burns |
| 2006/0133270 | A1 | 6/2006 | Lee |
| 2007/0201366 | A1* | 8/2007 | Liu .......................... H04L 47/15 370/235 |
| 2008/0109559 | A1* | 5/2008 | Chhabra ............. H04L 29/1282 709/238 |
| 2010/0061260 | A1* | 3/2010 | Bugenhagen ........... H04L 43/00 370/252 |
| 2010/0303244 | A1* | 12/2010 | Kim ....................... H04H 20/33 381/2 |
| 2013/0107707 | A1* | 5/2013 | Ramamurthy .......... H04L 47/22 370/230.1 |
| 2014/0153422 | A1 | 6/2014 | Nambiar et al. |
| 2016/0028637 | A1 | 1/2016 | Vasseur et al. |

OTHER PUBLICATIONS

Fortinet, Inc., "Traffic Shaping for FortiOS 5.0", FortiOS™ Handbook, http://docs.fortinet.com/uploaded/files/1080/fortigate-traffic-shaping-50.pdf, Mar. 5, 2014, 44 pgs.
International Search Report and Written Opinion mailed in International (PCT) Application No. PCT/US2017/046506 dated Nov. 23, 2017, 13 pgs.
International Preliminary Report on Patentability mailed in International (PCT) Application No. PCT/US2017/046506 dated Mar. 7, 2019, 12 pgs.

* cited by examiner

DEVICE SHAPING IN A COMMUNICATIONS NETWORK

Embodiments relate generally to communication systems, and, more particularly, to device-level shaping of traffic in a communications network. U.S. provisional patent application Ser. No. 62/379,055 (filed Aug. 24, 2016) is incorporated by reference herein in its entirety.

FIELD

Background

Many communication networks provide connectivity over at least one shared link between large numbers of user-side network nodes and one or more remote networks, such as a provider network and/or the Internet. Often, multiple customer premises equipment (CPE) devices (e.g., laptops, tablets, cell phones, smart televisions, etc.) can communicate with the network via a single user-side network node. For example, each user-side network node has a public network address (e.g., Internet Protocol address), while each CPE device behind the user-side network node is assigned a private network address that is only guaranteed to be unique in context of the private network behind the user-side network node.

Links in a communications network have limited bandwidth and provide connectivity to multiple user-side network nodes. Sharing a link involves allocating the limited bandwidth among those user-side network nodes. Typically, a traffic shaper in a provider-side network node shapes forward-link traffic destined for each user-side network node on a shared link before sending the traffic over the shared link. The traffic shaping can allocate the limited bandwidth among the user-side network nodes in a manner that is dynamic and intelligent, for example, seeking to meet a quality of service (QoS) target, or the like. However, in networks having CPE devices disposed in private networks behind user-side network nodes, it is typically only the user-side network node that is aware of the CPE devices behind it in the network, such that packets sent over the public network to those devices are marked with the user-side network node's public address as the destination. As such, traditional traffic shapers have difficulty shaping traffic with consideration for the characteristics of individual CPE devices behind the user-side network nodes. In many instances, however, traffic shaping that considers characteristics of particular destination CPE devices for forward-link traffic can result in more efficient bandwidth allocations, e.g., more optimally satisfy QoS targets, as compared to traffic shaping that considers only the user-side network node level.

BRIEF SUMMARY

Among other things, systems and methods are described for providing device-level traffic shaping in a communications network. Some embodiments operate in a satellite communications network, or other communication networks, that provide connectivity to large numbers of user-side network nodes via one or more shared communications links. Embodiments provide techniques for device-level traffic shaping in a communications network. Embodiments operate in communication networks providing connectivity to large numbers of user-side network nodes via shared communications links. For example, customer premises equipment (CPE) devices behind one of the user-side network nodes are classified into device types according to a predetermined rate-relevant characteristic of the CPE device. Upon receiving a forward-link (FL) traffic flow destined for one of the CPE devices, the device type of the CPE device is identified, and the FL traffic flow is shaped in accordance with a traffic shaping policy that corresponds to CPE device type. Various embodiments are tailored to support architectures having device-level shapers and/or network address translators (NAT) in user-side network nodes and/or in a provider-side network node.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
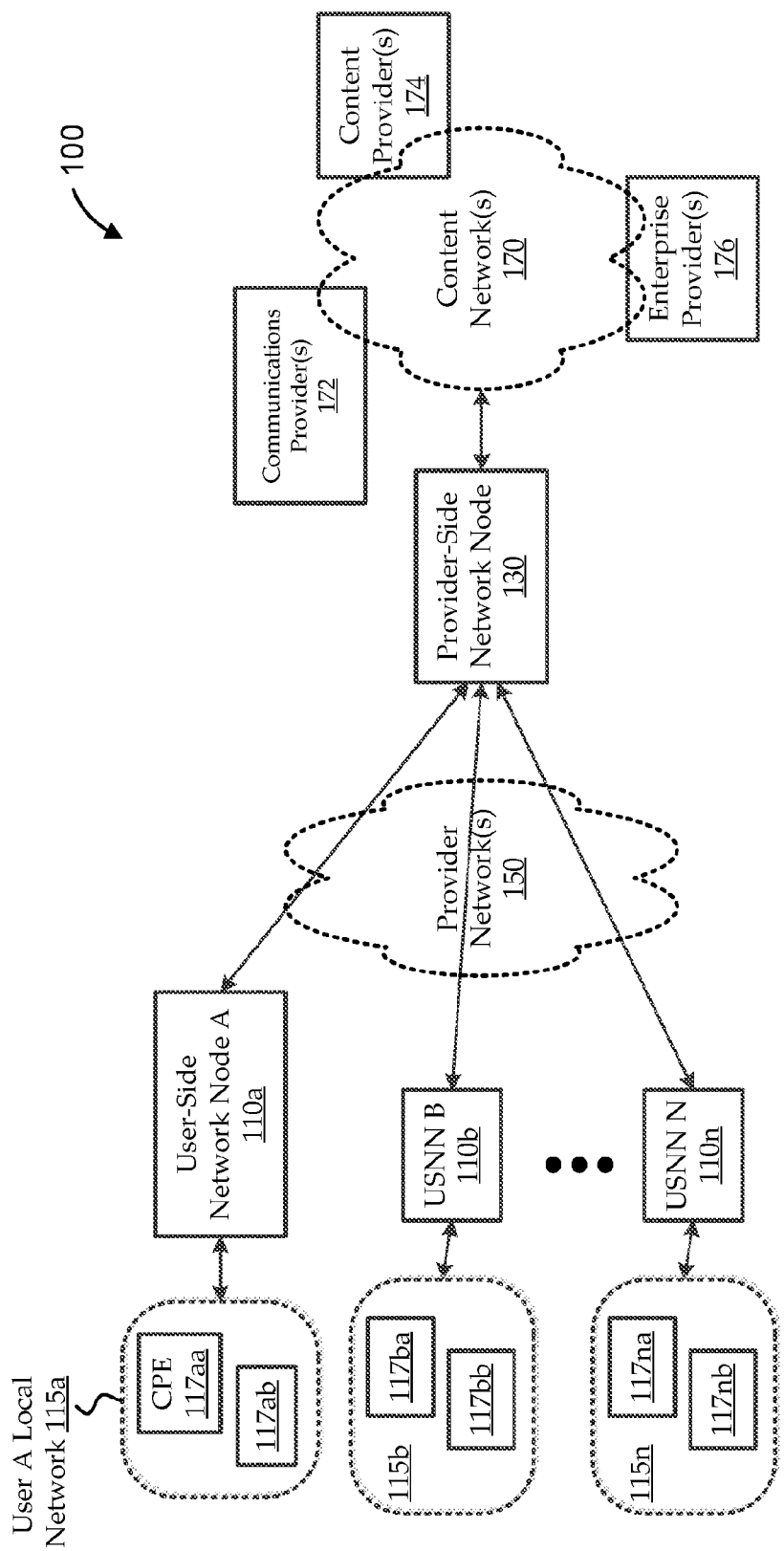
FIG. 1 shows an illustrative communications environment as a context for various embodiments.

FIG. 1 shows an illustrative communications environment 100, as a context for various embodiments. As illustrated, the communications environment 100 includes a number of user-side network nodes 110 (e.g., user terminals) in communications with at least one provider-side network node 130 (e.g., a core node) via a provider network 150. The user-side network nodes 110 can be fixed user terminals located at the residence or business location of the users. Alternatively, the user-side network nodes 110 can be in mobile craft such as airplanes, trains, automobiles, ships, etc. The provider-side network node 130 can be in communication with various providers, such as communications services providers 172, content services providers 174, enterprise services providers 176, and/or other providers via one or more content network(s) 170. For example, the content network(s) 170 can include the Internet and/or other public or private networks. The provider network 150 can include any suitable type of communications network that communicates with the user-side network nodes via one or more shared communications links. For example, the provider network 150 can include wired, wireless, public, private, secure, unsecure, and/or other network links. In some embodiments, the provider network 150 is a satellite communications network implemented with one or more geosynchronous earth orbit (GEO) satellites, medium earth orbit (MEO) satellites, low earth orbit (LEO) satellites, etc. Other embodiments can include digital subscriber line (DSL) network, a cable based network, a long-term evolution (LTE) wireless network, a cellular network, or the like.

At least some of the user-side network nodes 110 provide, or are coupled with, a respective local user network 115, such as a home Wi-Fi network or other private local area network. Each local user network 115 can include one or more consumer premises equipment (CPE) devices 117 that are coupled with their respective user-side network node 110 via wired or wireless connections. For example, the user-side network nodes 110 can include any suitable local network interface, such as a wired and/or wireless router that implements a local area network (LAN); and the CPE devices 117 can be home or office computing devices, such as desktop computers, laptop computers, smart phones, tablet devices, Internet-enabled televisions or other appliances, or the like. In some cases, a CPE device 117 can also be another local user network 115 (e.g., another LAN), which can have additional CPE devices 117 connected thereto.

In architectures having local user networks 115 implemented behind user-side network nodes 110, the user-side network node 110 can typically include a network address translator (NAT) that translates between an address of the user-side network node 110 and addresses of the CPE devices 117 behind the user-side network node. Generally, the address of the user-side network node 110 is used by the provider network 150 and/or the content network(s) 170 to uniquely identify the user-side network node 110 in the public-facing side of the user's network, and is referred to herein as a "public address" or "public network address" (e.g., a public Internet Protocol (IP) address and TCP/UDP port combination). The address of each CPE device 117 is used to uniquely identify the CPE device 117 in the local (e.g., private) user network 115, and is referred to herein as a "private address" or "private network addresses" (e.g., a private IP address). The terms "public" and "private" are intended only to clarify the nature of the CPE devices 117 as effectively hidden from the content sources that send content to those devices and receive content requests from those devices. For example, the public address of the user-side network node 110 may, in some cases, be implemented as a public IP address for content network(s) 170 and/or other nodes of the public Internet, while some provider-side network nodes 130 may implement the public address of the user-side network node 110 as a private IP address according to a particular communications protocol (e.g., point-of-presence, or PoP) user-side network node. Embodiments are described herein for architectures implementing a NAT in the provider-side network node 130 and for implementing NATs at each user-side network node 110.

It is assumed herein that multiple user-side network nodes 110 are in communication with the provider-side network node 130 via one or more shared communications links of the provider network 150. As each communications link has a limited amount of bandwidth, servicing the user-side network nodes 110 on a link can involve allocating that limited bandwidth among those user-side network nodes 110. Conventionally, in such an architecture, a traffic shaper can be implemented in the provider-side network node 130 to "shape" forward-link (FL) traffic destined for the user-side network nodes 110 before the FL traffic traverses a shared communications link, so that the bandwidth of the shared link is allocated dynamically and intelligently among the user-side network nodes 110. Traffic shaping conventionally refers to selectively dropping, delaying, or speeding up transmission of data packets of a data flow over a communications link to reduce or increase the link bandwidth consumed by that data flow. For example, conventional networks can include traffic management systems that allocate media access control (MAC) domain (MACD) bandwidth for each MACD across all configured consumers of the bandwidth (e.g., across all user-side network nodes 110, depending on actual traffic loads, specified traffic rates, quality of service (QoS) targets, and dynamically variable bandwidth capacity under various system load conditions). Often, traffic shaping can be performed at multiple levels of hierarchy, such as at a virtual network operator (VNO) level, a user-side network node 110 level, and a traffic class level. Such approaches can help provide fairness among all subscribers on the same plan and can work well under the assumption that the goal is to provision each subscriber on the same plan with the same bandwidth.

However, traffic shaping performed at the user-side network node 110 level traditionally has no consideration for characteristics of CPE devices 117 behind the user-side network node 110. For example, suppose a first FL traffic flow is a streaming movie from a content source destined for a smart phone with a small screen, and a second FL traffic flow is the same streaming movie from the same content source destined for a laptop with a larger screen. A conventional traffic shaper will likely treat both FL traffic flows in the same way, as they are both the same type of traffic from the same content source destined for the same type of user-side network node 110.

Conventionally, the traffic shaper does not have access to the private addresses of the CPE devices 117, such that its network resource allocations are based on the user-side network nodes 110, which are publicly identifiable on the network. For example, when the provider-side network node 130 receives (e.g., intercepts) FL traffic, the packet headers identify the destination for the FL traffic as the public address of the user-side network node 110 (even though, ultimately, the user-side network node 110 will forward the traffic to a CPE device 117 in its local user network 115). As such, even though conventional traffic shapers are able to identify different FL traffic flows by their public address and port combination, they tend not to be able to associate each such flow with a unique CPE device 117, and hence do not consider device-level characteristics in their traffic shaping determinations.

Embodiments described herein include novel approaches to traffic shaping, which are referred to herein as "device shaping." As opposed to the user-side network node-level shaping of many conventional traffic shapers, which makes traffic shaping determinations based only on characteristics of the user-side network nodes 110 without awareness of the CPE devices 117 behind those user-side network nodes 110, device shaping enables the network to make traffic shaping determinations in a manner that considers different device-level characteristics of different CPE devices 117 behind the user-side network nodes 110. In such contexts, the terms "shaping," "traffic shaping," "device shaping," and the like are intended broadly to include conventional notions of traffic shaping, as well as any other actions taken to reduce or increase the allocated resources of a communications link as consumed by a data flow. For example, some embodiments involve traffic flows having adaptive traffic, such as adaptive bit rate (ABR) traffic, adaptively encoded traffic (e.g., H.264 AVC traffic), etc. In such embodiments, shaping of the traffic can involve having the content provider select an appropriate version of the traffic that has a particular bit rate, a particular set of base and enhancement encoding layers, etc. Device shaping can customize adaptive video bandwidth, or otherwise manage bandwidth allocations, to each of multiple device classes, thereby avoiding impacting quality of experience (QoE) of end consumers. Such approaches can also tend to free up bandwidth either to accommodate additional subscribers and/or to provide better QoE for some or all device classes. Some embodiments operate in context of service plan offerings in which user-subscribers have unlimited access, or are otherwise effectively unconcerned with their usage habits or with the amount of bandwidth they consume.

Various embodiments are described herein in context of different network architectures. As one general category of embodiments, forward-link traffic shaping is performed at the user-side network nodes 110. For example, a user-side network node 110 can determine from initial packets of the forward-link traffic flow whether it can control the bandwidth of the shared link that will be consumed by subsequent packets of the flow. If so, the user-side network node 110 can itself perform traffic shaping or provide implicit or explicit feedback to a traffic shaper in a provider-side network node 130 or other provider-side device (e.g., content provider 174), thereby causing regulation of the bandwidth of the shared link, as appropriate for subsequent packets of the flow. Examples of such embodiments are described with reference to FIGS. 2, 3A, and 3B below.

As another general category of embodiments, a device shaper in a provider-side network node 130 is configured to shape traffic to individual CPE devices 117 behind each user-side network node 110 in accordance with characteristics of each device. For example, a return-link flow from a particular CPE device 117 can be marked in the user-side network node 110 with an identifier that indicates a classification of the CPE device 117 that originated the flow. Components of a provider-side network node 130 can store (e.g., in a look up table (LUT)) the identifier indicating the classification of the CPE device 117 with data that can be used to identify a subsequent forward-link flow associated with the return-link flow. When a subsequent forward-link flow is received at the provider-side network node 130, components can use the stored identifiers (e.g., in the LUT) to determine if the forward-link traffic flow corresponds to a known return-link flow. If so, the device shaper in the provider-side network node 130 can shape the forward-link flow in accordance with the classification of the CPE device 117 that originated the corresponding return-link flow. In some such embodiments, the provider-side network node 130 maintains connectivity with each user-side network node 110 on a shared link using virtual tunnels (e.g., Layer 2 tunnels), and various "private" network functions can be performed by components of the provider-side network node 130. An example of a private network function in this context is network address translation (NAT) functionality, which can be used to translate between a private Internet protocol (IP) address of a CPE device 117 on a local user network 115 and a public IP address of the user-side network node 110 that couples the local user network 115 to other networks (e.g., the content network(s) 170 via the provider network 150). In other such embodiments, private network functions are performed at the user-side network nodes 110 (e.g., the user-side network node 110 includes a NAT). Examples of these embodiments are described with reference to FIGS. 4-7B below.

Figure 2:
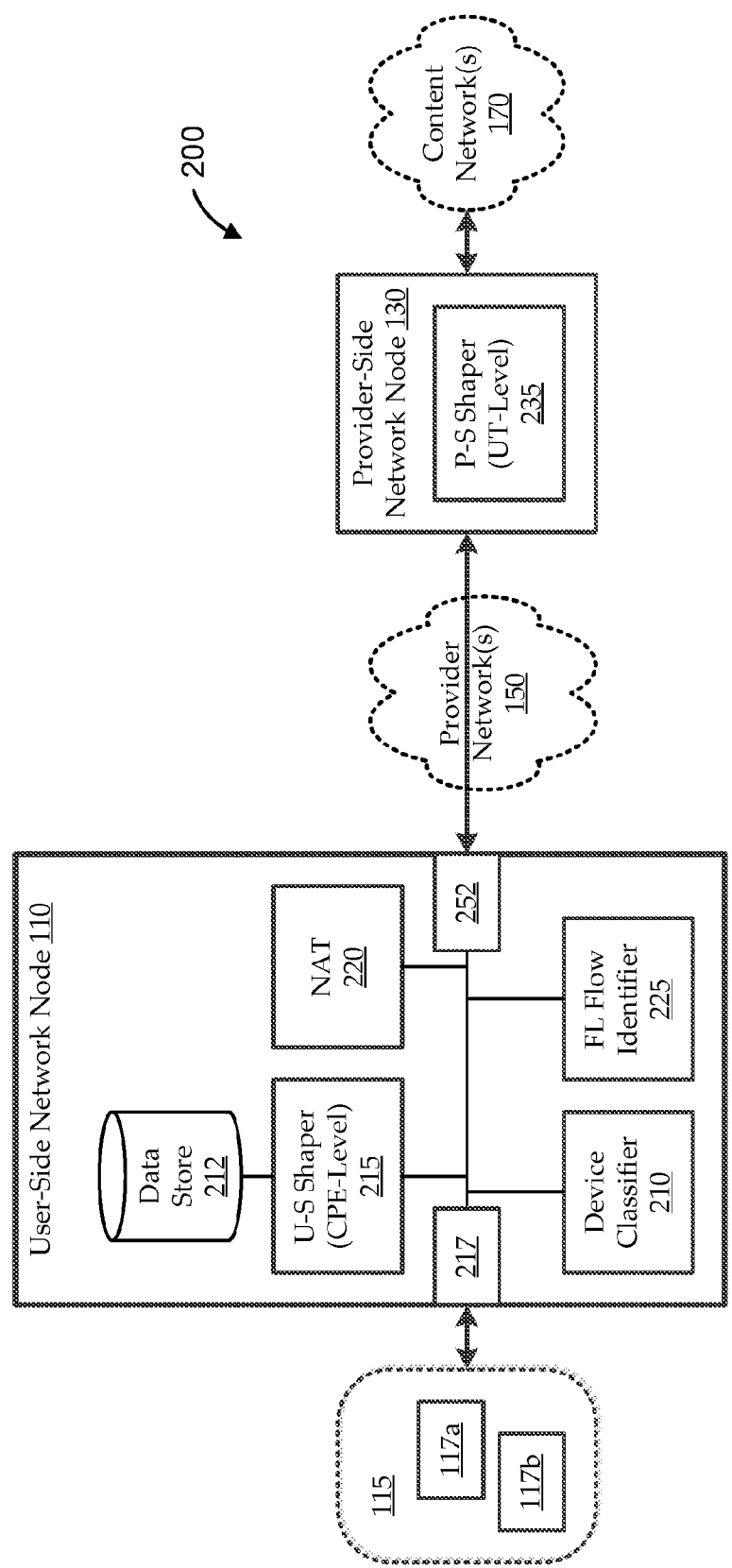
FIG. 2 shows an illustrative communications environment having an architecture in which both device shaping functions and network address translation functions are implemented at the user-side network node, according to various embodiments.

FIG. 2 shows an illustrative communications environment 200 having an architecture in which both device shaping functions and network address translation functions are implemented at the user-side network node 110, according to various embodiments. Similar to FIG. 1, the communications environment 200 includes a number of user-side network nodes 110 (only one is shown to avoid over-complicating the Figure) in communication with at least one provider-side network node 130 via a provider network 150, and the provider-side network node 130 can be in communication with various content services via one or more content network(s) 170. To avoid over-complicating the figures, content services, and the like, are not explicitly shown. The content services can include web servers, voice over Internet protocol (VoIP) services, media content providers, content distribution networks, and/or any other suitable content services. The user-side network node 110 is illustrated as implementing a local user network 115 having multiple CPE devices 117.

As illustrated, each user-side network node 110 can include a provider network interface 252 that includes any suitable network ports, transceiver components, and/or other components for providing connectivity between the user-side network node 110 and the provider network 150 (or multiple provider network(s) 150 in some embodiments). Further, each user-side network node 110 can include a user network interface 217 that includes any suitable network ports, device interfaces, and/or other components for providing connectivity between the user-side network node 110 and the local user network 115. Though not explicitly shown throughout the various figures, any embodiments of user-side network nodes 110 described herein can include one or more provider network interfaces 252 and/or one or more user network interfaces 217.

In the illustrated architecture, there is a provider-side shaper 235 implemented in the provider-side network node 130 and a user-side shaper 215 (e.g., a device shaper) implemented in the user-side network node 110. The provider-side shaper 235 can be implemented as a user-side network node-level traffic shaper, with the user-side shaper 215 performing or facilitating CPE device 117 level shaping (device shaping). Some embodiments perform all device shaping in the user-side shaper 215 (i.e., none of the device shaping is performed in the provider-side shaper 235). As illustrated, some embodiments of the user-side shaper 215 can include, or be in communication with, one or more data stores 212 that have, stored thereon, device-shaping policies and/or other relevant information. For example, as described herein, CPE devices 117 are classified into device classes based on rate-relevant characteristics, and appropriate device shaping policies are identified, accordingly. As such, the data store(s) 212 can include information relating to device classes, rate-relevant characteristics, device shaping policies (e.g., device-shaping rules), etc.

The user-side network node 110 can also include a device classifier 210, a network address translator (NAT) 220, and a forward-link flow identifier 225. Though embodiments are described as having the NAT 220 in the user-side network node 110, such descriptions are intended generally to include any implementation of network address translation functions downstream of the provider-side shaper 235 (e.g., between the provider-side shaper 235 and the user-side network node 110). For example, the NAT 220 can be implemented outside the user-side network node 110 (e.g., as a separate appliance at the user or provider side of the provider network 150), or even in the provider-side network node 130 downstream of the provider-side shaper 235. In any of these or other implementations, device shaping can be performed according to the techniques described with respect to FIG. 2.

Figure 12:
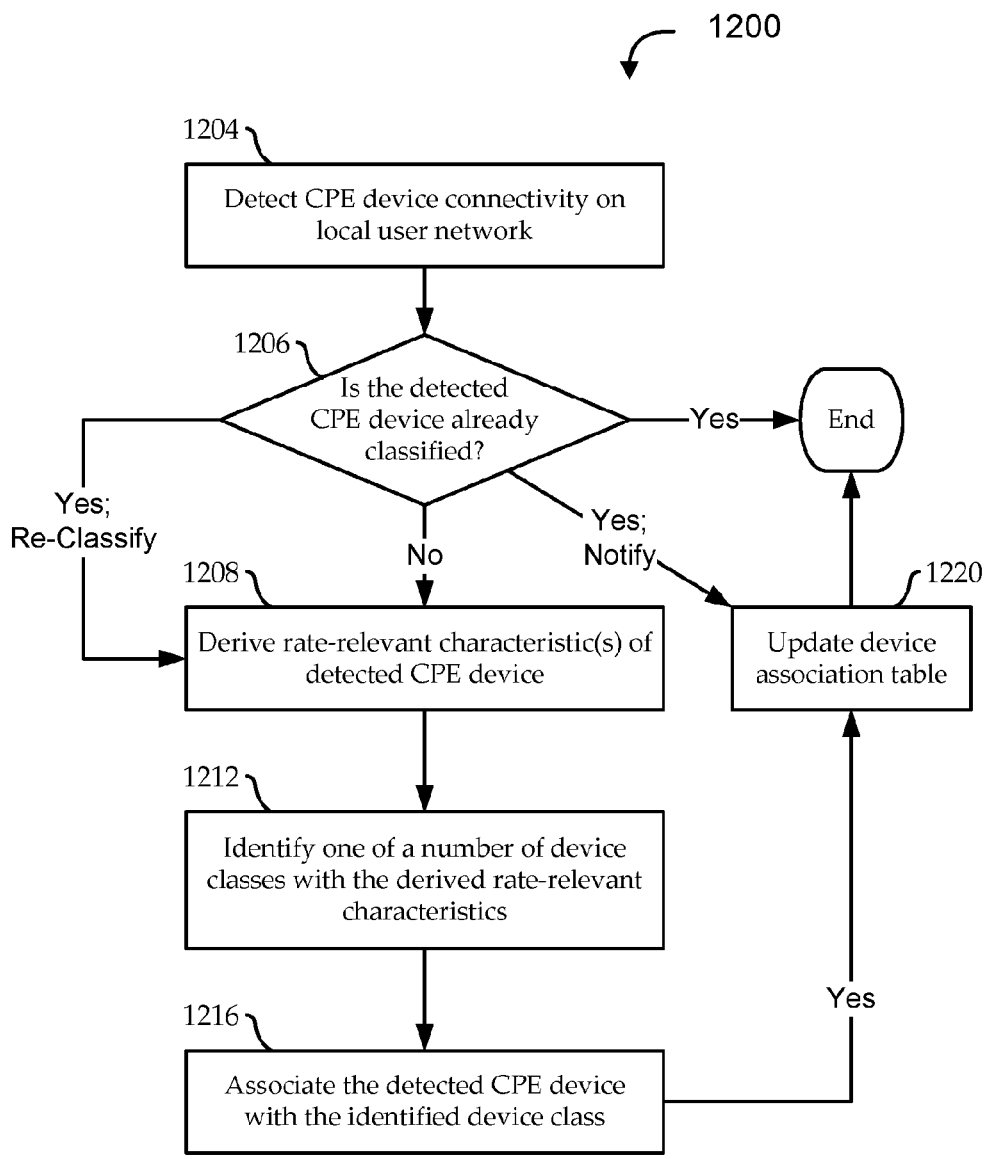
FIG. 12 illustrates an example of a method for classifying CPE devices according to various embodiments.

Further, embodiments can associate a particular CPE device 117 with one of multiple device classes in any suitable manner. For example, FIG. 12 shows a flow diagram of an illustrative method 1200 for classifying CPE devices 117, according to various embodiments. Some embodiments begin at stage 1204 by detecting connectivity of a CPE device 117 with the local user network 115. For example, embodiments of the device classifier 210 detect new CPE devices 117 when they establish connectivity with the user-side network node 110. The detected CPE device 117 can be identified based on its MAC address or any other suitable identifier. Other embodiments can classify devices at any suitable time, including at times other than when a CPE device 117 establishes connectivity with the local user network 115. For example, some embodiments can periodically audit local connections to determine which CPE devices 117 are present on the local user network 115. Alternatively or additionally, embodiments can include a preloaded table of associations between CPE devices 117 and respective device classifications (e.g., default classifications, etc.).

At stage 1206, in response to detecting a new CPE device 117, some implementations of the device classifier 210 determine whether the detected CPE device 117 was previously classified. For example, embodiments can query a table of associations between previously classified CPE devices 117 and their respective device classes. If the determination is that the CPE device 117 is already classified, embodiments can take any suitable action, such as re-classifying the CPE device 117 (e.g., the classifications can become stale, etc.), updating the table of associations to indicate that the device is presently connected at stage 1220, or ending the method 1200. In some implementations, the device classifier 210 can dynamically add a set of device shaping rules based on stored device shaping policies for the new CPE device 117 based on its previously determined device class (e.g., and based on additional factors, such as present network congestion). In some such implementations, the device classifier 210 can age out stale CPE devices 117 by removing device shaping rules for those CPE devices 117 after some time (e.g., periodically, after a predefined period of non-use, etc.). As described herein, other implementations can perform all handling of device shaping rules by the user-side shaper 215.

If the determination at stage 1206 is that the detected CPE device 117 does not already have a stored classification, classification of the CPE device 117 can further involve identifying one or more rate-relevant characteristics of each classified device at stage 1208. A rate-relevant characteristic can be any characteristic of the CPE device 117 that can have an impact on QoE with respect to data rate. For example, a particular data rate may provide a sufficiently high QoE for viewing on a small smart phone screen, while the same data rate may provide a poor QoE for viewing on a large laptop screen. In some implementations, operating system and device type can be used to categorize devices by functional area (e.g., media player, personal computer, laptop computer, tablet, smart phone, Internet-enabled television, etc.), screen fidelity (e.g., screen size, resolution, color depth, supported video codecs, etc.), and/or other rate-relevant characteristics of each CPE device 117. Although classifying CPE devices 117 based on rate-relevant characteristics is discussed above and in following paragraphs, CPE devices 117 can be classified based on other characteristics.

Other data can be used in other embodiments to determine rate-relevant characteristics of a CPE device 117. As one implementation, the name of the CPE device 117 on the local user network 115 (sometimes referred to as the "hostname") is used to derive clues about the device classification. For example, a CPE device 117 named "John Doe's iPhone" is likely a cellphone with a cellphone-sized screen. In another implementation, the device's manufacturer, which can be indicated by an OUI code in the device's MAC address, can be used to derive clues about the device classification. For example, an OUI code indicating "Zenith" likely identifies a CPE device 117 that is a television and has a relatively large screen. In another implementation, the type of the connection (e.g., wired or wireless) between the CPE device 117 and the user-side network node 110 can be used to derive clues about device classification. For example, it is likely that wired connections correspond to CPE devices 117 having larger screens (e.g., televisions and desktop computers), while wireless connections correspond to CPE devices 117 having smaller screens (e.g., cellphones, tablets, and laptops). Similarly, some implementations can determine a Wi-Fi mode of operations support on the LAN side (e.g., 802.11b, 802.11g, 802.11n, 802.11ac) and/or various other Wi-Fi specific connection properties; and such properties can indicate other rate-relevant characteristics of connected CPE devices 117. In some implementations, deep packet inspection (DPI) techniques are used to derive rate-relevant characteristics. For example, HTTP user agent strings can be inspected to derive an operating system and device type of a platform. In other embodiments, devices are uniquely classified (e.g., rate-relevant characteristics are identified and associated with the CPE device 117) based on combinations of hostname, organizationally unique identifier (OUI), and connection properties (e.g., wireless connection versus wired, speed of wireless connection, etc.). Some implementations enable such classification through integrated management of modem, router, and cloud equipment as part of an extended provider network 150.

At stage 1212, embodiments can determine an appropriate device class, e.g., based on the identified rate-relevant characteristics of the CPE device 117. For example, implementations can include a lookup table, or the like, that maps certain rate-relevant characteristics to certain device classes. As an example, the lookup table can identify device classes in any suitable manner (e.g., "class_01"; "class_02"; etc.), and each can be associated in the lookup table with particular rate-relevant characteristics (e.g., "class_01"=small-screen portable device). The identified device class can be associated with an identifier of the CPE device 117 in stage 1216. For example, a device association table can be updated at stage 1220 to include an entry that associates the MAC address of a detected CPE device 117 with "class_01".

As described above, it can be desirable to perform traffic shaping in a manner that considers rate-relevant characteristics of the CPE devices 117 sitting behind the user-side network nodes 110 in the network. However, because of the NAT 220 in each user-side network node 110, FL traffic traversing the provider network 150 indicates a destination address corresponding to a user-side network node 110 (i.e., the public address), not to the actual destination CPE device 117 (which is privately identified to the NAT 220, but not to the provider-side network node 130). Accordingly, embodiments described in context of the illustrated architecture seek to determine which CPE device 117 is associated with a FL traffic flow after address translation is performed by the NAT 220. The identified CPE device 117 would have been classified into a device class by the device classifier 210 (e.g., when the CPE device 117 was first connected to the user-side network node 110 as discussed above) and the classification stored, and a corresponding device shaping policy can be identified to apply to the FL traffic flow by the device classifier 210 and/or by the user-side shaper 215. In some embodiments, the user-side shaper 215 can implement device shaping rules of the device shaping policy at least partially by communicating the rules, implicitly and/or explicitly, back to the provider-side shaper 235.

Figure 3A:
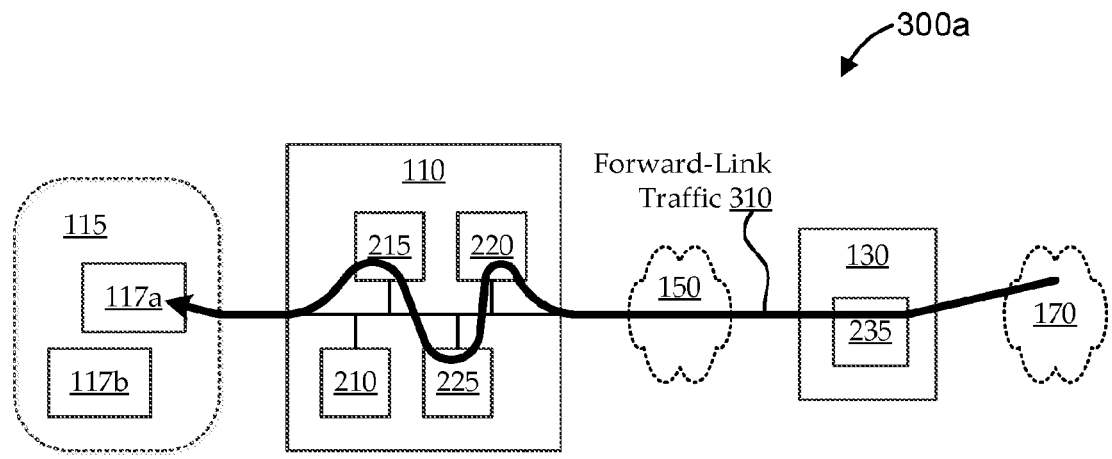
FIGS. 3A and 3B show illustrative device shaping in an architecture, like the communications environment of FIG. 2.
Figure 3B:
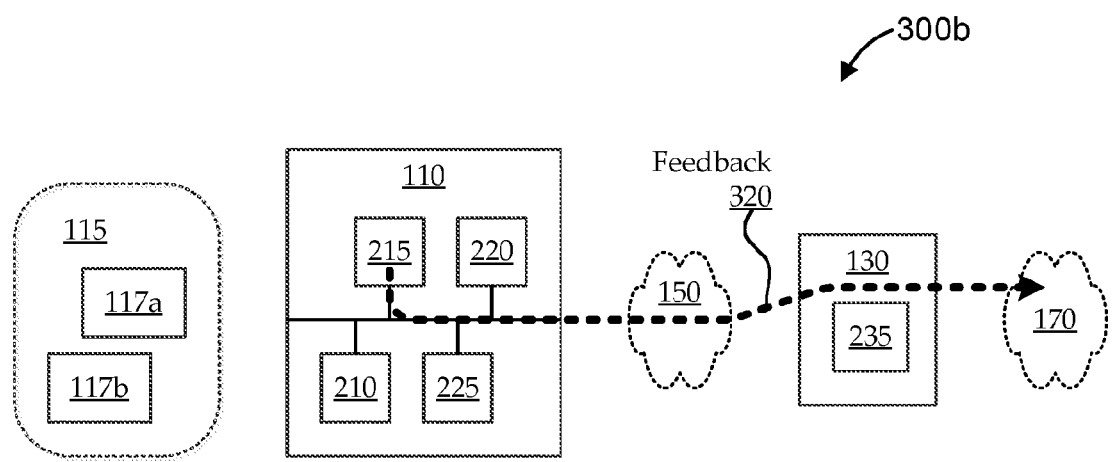

For added clarity, FIGS. 3A and 3B show illustrative device shaping in an architecture 300, like the communications environment 200 of FIG. 2. In some implementations, the provider-side shaper 235 can be implemented similar to a conventional traffic shaper, and the device shaping functionality is imposed on the provider-side shaper 235 by the user-side shaper 215. In other embodiments, there is not a provider-side shaper 235.

A FL traffic flow 310 is illustrated in FIG. 3A by a thick arrow. The FL traffic flow 310 begins at a content provider in a content network 170 and flows through the provider-side network node 130 (e.g., the FL traffic flow 310 may or may not flow through the provider-side shaper 235 in the provider-side network node 130). Packets of the FL traffic flow 310 include at least an identifier of the destination user-side network node 110 for the FL traffic flow 310. For example, each packet includes a header that has a 5-tuple indicating a source IP address and source port number (of the content source in the content network 170), a destination IP address and destination port number (of the destination user-side network node 110), and a protocol identifier. Initially, the provider-side shaper 235 may perform traffic shaping based, for example, on present link congestion, traffic type, destination user-side network node 110, and/or other considerations. However, it is assumed that the destination identification corresponds to the public address of the user-side network node 110, rather than the private address of the ultimate destination CPE device 117, as the destination CPE device 117 is behind a user-side NAT 220. As such, the provider-side shaper 235 will not initially perform device shaping, as it is unaware of characteristics of the ultimate destination CPE device 117 for the flow.

The FL traffic flow 310 is communicated (according to the destination identification in the packets) from the provider-side network node 130 to the destination user-side network node 110 via the provider network 150. The NAT 220 in the user-side network node 110 can identify the appropriate destination CPE device 117 for the FL traffic flow 310. In some implementations, a forward-link flow identifier 225 can identify the FL traffic flow 310 as carrying adaptive-rate traffic, associate the FL traffic flow 310 with a particular destination CPE device 117, and/or associate the FL traffic flow 310 with a FL flow identifier. For example, being aware of the ultimate destination CPE device 117 (e.g., after address translation by the NAT 220), the forward-link flow identifier 225 can identify a device classification of the destination CPE device 117 (e.g., a small-screen device supporting a particular video codec), and can tag the FL traffic flow 310 with the identified device classification, or otherwise provide an indication of the device classification, in a manner that is usable by the user-side shaper 215. It is assumed that the destination CPE device 117 was previously classified by the device classifier 210 in the user-side network node 110. Based on the device classification associated with the destination CPE device 117, the user-side shaper 215 can determine an appropriate device shaping profile to apply to the FL traffic flow 310 (e.g., whether and how to shape the traffic and/or adjust shaping of the traffic based on rate-relevant characteristics of the destination CPE device 117). In some implementations, the user-side shaper 215 can include the forward-link flow identifier 225 (e.g., they can be integrated into a single component).

Turning to FIG. 3B, having determined an appropriate device shaping profile (e.g., a set of device shaping rules) by the user-side shaper 215, embodiments can use various techniques to effect the device shaping rules in the provider-side shaper 235. In some embodiments, the user-side shaper 215 explicitly communicates control information back to the provider-side shaper 235 (e.g., over the shared link, over a special control data channel, or in any other suitable manner), directing the provider-side shaper 235 to implement the identified device shaping rules. In one such embodiment, the control information includes explicit directives for the provider-side shaper 235 corresponding to the identified device shaping rules. In another such embodiment, the control information identifies either a subset of rules or one of a number of shaping profiles stored at the provider-side shaper 235. For example, the provider-side shaper 235 includes, or is in communication with, a lookup table or other data store that has, stored thereon, a set of shaping rules and/or profiles, and the control information identifies which of the stored rules or profiles to make active. In other embodiments, the user-side shaper 215 implicitly communicates the device shaping determination back to the provider-side shaper 235. For example, the user-side shaper 215 can generate real and/or apparent packet errors (e.g., by sending negative acknowledgement messages (NACKs), by dropping packets, etc.), implicitly indicating a congestion condition to the provider-side shaper 235. The provider-side shaper 235 can then respond to the apparent congestion condition by shaping subsequent FL traffic, accordingly. In some implementations, for some types of traffic, apparent congestion information can be fed back to the content provider; and the content provider can react accordingly, thereby effectively shaping the traffic. For example, some streaming media services can automatically select an appropriate one of multiple versions of content, each encoded according to a different bit rate, in response to detecting congestion conditions.

Some embodiments described herein are intended to apply to FL traffic flows 310 carrying rate-adaptive traffic. As described above, rate-adaptive traffic can include adaptive bit rate (ABR) encoded traffic, and/or other adaptively encoded traffic. Rate-adaptive traffic can also generally include types of traffic that are multiple encoded (e.g., by a content distributor, at a content source, at the provider-side network node 130, etc.) into different versions that can be communicated with different link resource impacts (e.g., at different bit rates, at different fidelities, in different encoding formats, etc.), such that rate adaptation can include selecting and/or generating an appropriate version of the content in response to a shaping condition. Some embodiments begin transmitting the FL traffic flow 310 at some default, or some previously established, quality (e.g., bit rate); and subsequently adapt based on device shaping determinations.

For the sake of illustration, some content sources send content packets at a default rate (e.g., or any previously determined rate). If no receipt acknowledgement (e.g., "ACK" message) is received by the content source from the destination node (e.g., user-side network node 110) within a timeout period, the content provider automatically adjusts its traffic to a lower bit rate. For example, packets are assumed to have been dropped and are resent at the lower rate. If no receipt acknowledgement is received at the lower rate, the content provider can continue iteratively to lower the rate until receipt acknowledgements begin to be received, or a lowest rate is reached. In context of such content sources, embodiments of the user-side shaper 215 can impact the data rate of traffic sent from such content sources by selectively dropping packets, or appearing to drop packets (e.g., by not sending ACK messages), until packets begin to be received at a desired rate. In such an implementation, the feedback 320 shown in FIG. 3B can thus be implicit as a lack of ACK messages, or as a presence of NACK (negative acknowledgement) messages, to the content source. Note that the feedback 320 is thus intended to cover broadly not only explicit feedback but also such implicit feedback. Moreover, the feedback 320 can be to the UT-level shaper 235 and/or another device such as the content provider that is the source of the FL flow 310.

Figure 4:
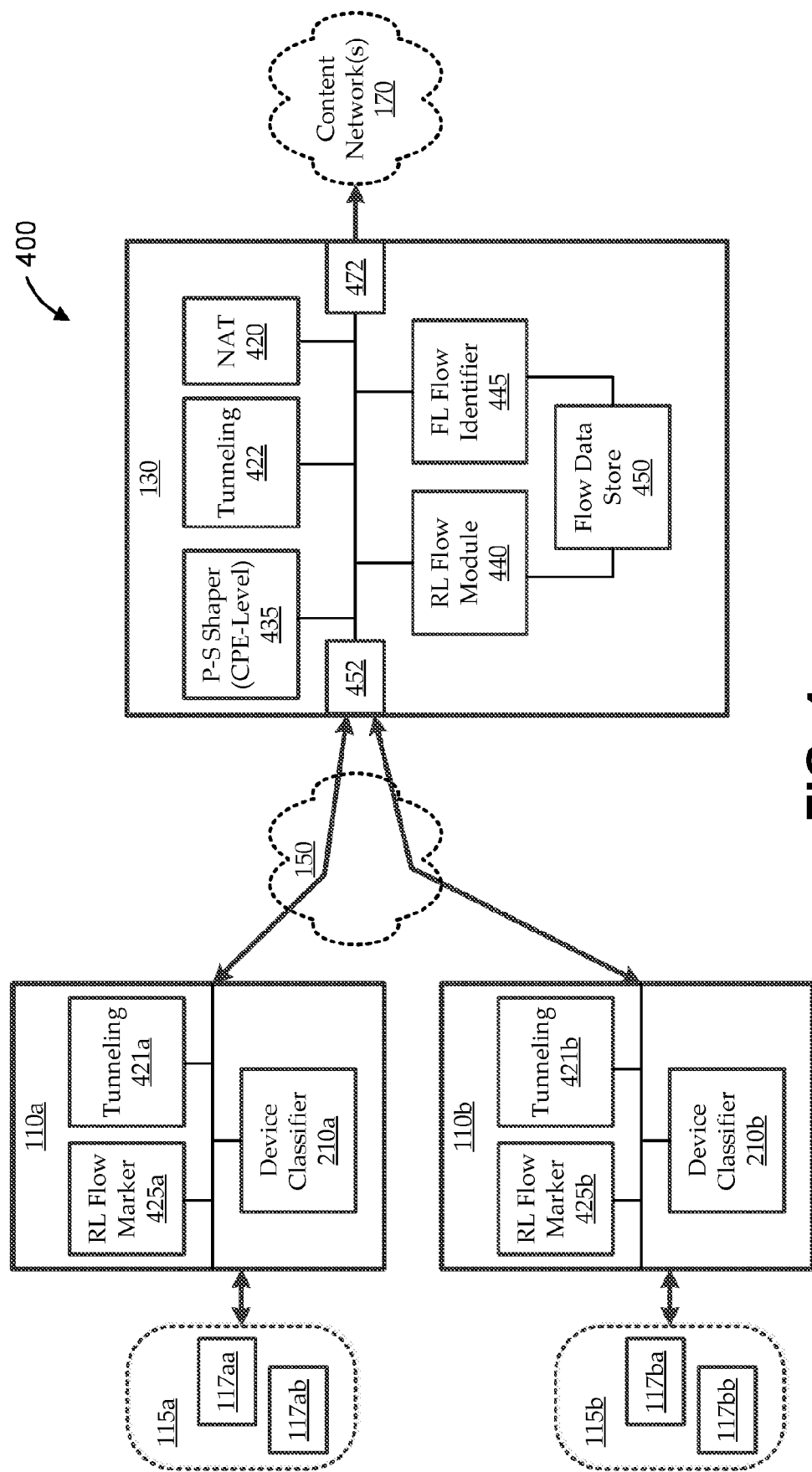
FIG. 4 shows an illustrative communications environment having an architecture in which both device shaping functions and network address translation functions are implemented in the provider-side network node, according to various embodiments.

FIG. 4 shows an illustrative communications environment 400 having an architecture in which both device shaping functions and network address translation functions are implemented in the provider-side network node 130, according to various embodiments. Similar to FIGS. 1 and 2, the communications environment 400 includes a number of user-side network nodes 110 (only two are shown to avoid over-complicating the Figure) in communication with at least one provider-side network node 130 via a provider network 150, and the provider-side network node 130 can be in communication with various content services via one or more content network(s) 170. As illustrated, each provider-side network node 130 can include a provider network interface 452 that includes any suitable components for providing connectivity between the provider-side network node 130 and the provider network 150 (or multiple provider network(s) 150 in some embodiments); and each provider-side network node 130 can include a content network interface 472 that includes any suitable components for providing connectivity between the provider-side network node 130 and one or more content network(s) 170. Though not explicitly shown throughout the various figures, any embodiments of provider-side network nodes 130 described herein can include one or more provider network interfaces 452 and/or one or more content network interfaces 472.

Each user-side network node 110 is illustrated as implementing a respective local user network 115, and each local user network 115 is shown as having multiple CPE devices 117. As in the architecture of FIG. 2, each user-side network node 110 includes a device classifier 210. Unlike FIG. 2, each user-side network node 110 includes a return-link (RL) flow marker 425; and the provider-side network node 130 includes a provider-side shaper 435, a NAT 420, a FL flow identifier 445, a RL flow module 440, and a flow data store 450. As also shown, each user-side network node 110 includes a tunneling module 421 by which a network tunnel is established between the user-side network node 110 and a similar tunneling module 422 in the provider-side network node 130. In the illustrated architecture, because the NAT 420 is implemented in the provider-side network node 130, the provider-side shaper 435 can be aware of, and can consider characteristics of, the ultimate destination CPE devices 117 of FL traffic flows, thereby enabling device shaping in the provider-side shaper 435. NAT 420 can implement NAT functionality in any suitable manner. For example, NAT 420 can implement traditional NAT functionality. As another example, NAT 420 can implement carrier grade network address translation (CGNAT) functionality.

Though not explicitly shown, some embodiments of the provider-side shaper 435 can include, or be in communication with, one or more data stores (e.g., similar to the data store(s) 212 described with reference to FIG. 2). The data stores can have, stored thereon, any suitable information relating to device classes, rate-relevant characteristics, device shaping policies (e.g., device-shaping rules), etc. The tunneling modules 421 and 422 can provide a unique network tunnel between the provider-side network node 130 and each user-side network node 110. As will be seen, the unique identifier associated with each such tunnel can be used to keep track of which user-side network nodes 110 are associated with which flows in the provider-side network node 130 (as described below). For example, an RL traffic flow received at the provider-side network node 130 can include the network address of the originating CPE device 117 (e.g., CPE device 117aa), without an indication of the user-side network node 110 associated with that originating CPE device 117. The tunnel identifier, however, can be used as an indication of the associated user-side network node 110.

Embodiments operating in the illustrated architecture can use the RL flow marker 425 to mark RL traffic flows in association with a particular CPE device 117. In some embodiments, the RL flow marker 425 receives a RL flow from a CPE device 117. The RL flow marker 425 can associate the RL flow with an indication of the device classification of the originating CPE device 117, which was previously classified by the device classifier 210. For example, the RL flow marker 425 can mark packets of the RL flow with an indication of the device classification of the originating CPE device 117. When the RL flow is received by the provider-side network node 130, data characterizing the RL flow (e.g., the data associated with the RL flow by the RL flow marker 425) can be stored by the RL flow module 440 in the flow data store 450. For example, data identifying the RL flow can be stored in the flow data store 450 with data identifying the type of the CPE device 117 that originated the RL flow. When a corresponding FL traffic flow is received at the provider-side network node 130, the FL flow identifier 445 can search the flow data store 450 for a corresponding RL flow, and if found, can identify the type of the CPE device 117 to which the FL flow is destined. The P-S shaper 435 can then shape the FL flow to the type of the destination CPE device 117.

Figure 5A:
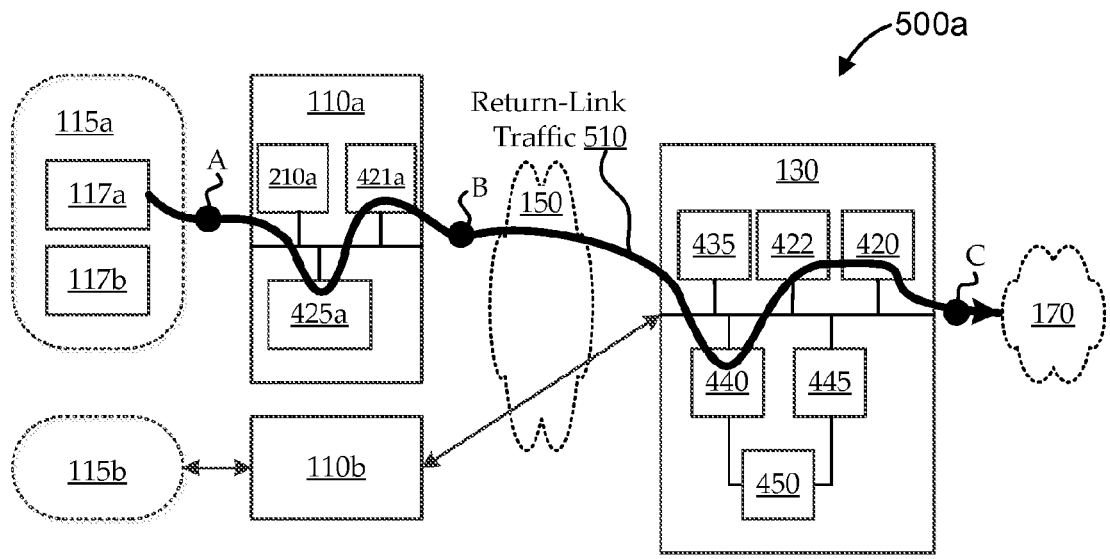
FIGS. 5A and 5B show illustrative device shaping in an architecture, like the communications environment of FIG. 4.
Figure 5B:
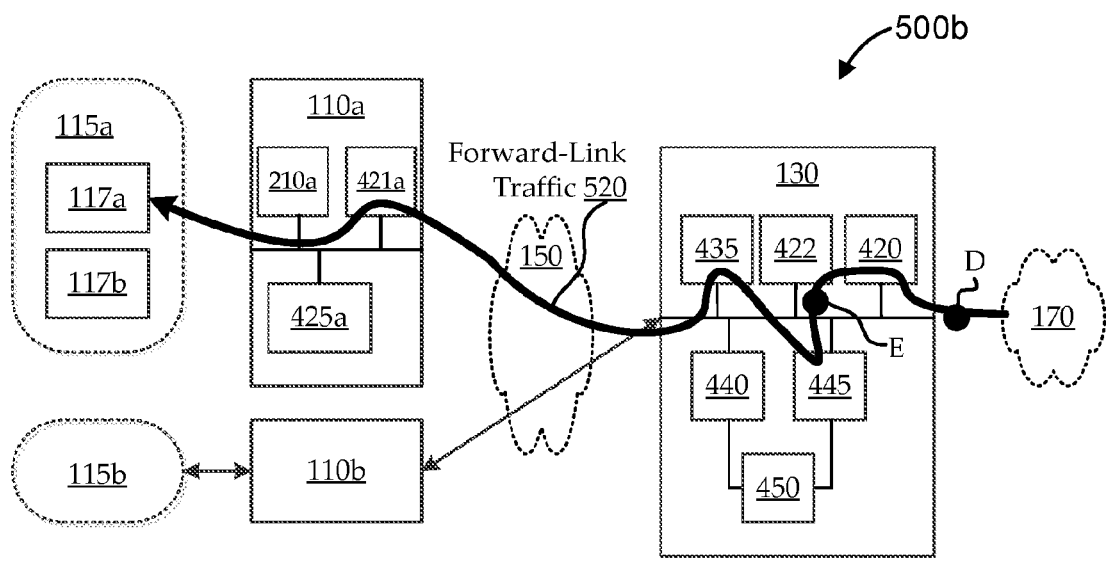

For added clarity, FIGS. 5A and 5B show illustrative device shaping in an architecture 500, like the communications environment 400 of FIG. 4. As described above, the communications environment 400 is architected to use components of the provider-side network node 130 to implement certain functionality that would typically be in the user-side network node 110. In particular, NAT functionality can be implemented in a provider-side NAT 420. As noted above, virtual tunnels can be used to provide connectivity between the tunneling module 422 in the provider-side network node 130 and a corresponding tunneling module 421 in each user-side network node 110 over the shared links of the provider network 150. Such an architecture can be used as part of a virtual computing implementation, for example, as in a cloud service offering built with software defined networking or network function virtualization techniques.

Turning first to FIG. 5A, a return-link (RL) traffic flow 510 is shown as a thick arrow. The RL traffic flow 510 begins at a source CPE device 117a and is destined for a content node or other destination in the content network 170 (e.g., the RL traffic flow 510 corresponds to a content request from CPE device 117a to a content server in content network 170). At a location labeled 'A', the packets of the RL traffic flow 510 include header information identifying a source address as the private address (e.g., private IP address) of the CPE device 117a, and a destination address as the public address of the destination content node. It can be assumed that CPE device 117a has been classified by a device classifier 210a, as described above.

The RL traffic flow 510 is received by the user-side network node 110a. A RL flow marker 425 in the user-side network node 110 marks packets of the RL traffic flow 510 with an identifier that indicates the device classification of the source CPE device 117a. The tunneling module 421a then encapsulates the packets with a tunnel header identifying the tunneling module 422 in the provider-side network node 130 as the end point of the tunnel. The tunnel header can also include a unique tunnel identifier distinguishing the tunnel from all other tunnels between the provider-side network node 130 and other user-side network nodes 110. Accordingly, at the location labeled 'B' (i.e., where the packets of the RL traffic flow 510 leave the user-side network node 110a destined for the provider-side network node 130), each packet is associated with one or more identifiers that indicate a source address as the private address of CPE device 117a, a destination address as the public address of the content node, a classification type of the CPE device 117a (e.g., an actual device type label, an index to a list of stored device types, etc.), and a tunnel identifier (which uniquely identifies the user-side network node 110a from all other user-side network nodes 110 connected through the provider network 150 to the provider-side network node 130). Though embodiments are described as using a tunnel identifier to effectively identify the user-side network node 110a to the provider-side network node 130, any suitable identifier can be used in alternative embodiments. For example, the packet can be labeled with an identification of the user-side network node 110a itself.

The RL traffic flow 510 traverses the provider network 150 and arrives at the provider-side network node 130. At the provider-side network node 130, a RL flow module 440 stores identification information for the RL traffic flow 510 in a flow data store 450. For example, the RL flow module 440 can associate a RL flow identifier with the RL traffic flow 510, and the RL flow identifier can be stored in the flow data store 450 in association with an indication of the device classification of CPE device 117a. In some implementations, for each RL flow received at the provider-side network node 130, the flow data store 450 has an entry that includes inverted source and destination addresses of the RL flow (which will thus identify a later forward-link flow that corresponds to the stored RL traffic flow 510), a tunnel identifier, and an indication of the device classification of the source CPE device 117a. In the described implementation, the stored FL destination will correspond to the private address of CPE device 117a, and not to the public address of user-side network node 110a; but the tunnel identifier will be unique to the user-side network node 110a. After processing by the RL flow module 440, the packets of the RL traffic flow 510 are prepared for communication to the destination content node. In some embodiments, the RL flow module 440 effectively strips the device classification from the packets of the RL flow 510, and the tunneling module 422 decapsulates the packets. The NAT 420 translates the network source address of the packets from the private network address of the source CPE device 117a to the public network address of the user-side network node 110a. Accordingly, at the location labeled 'C' (i.e., where the packets of the RL traffic flow 510 leave the provider-side network node 130 destined for the content network 170), each packet is labeled with a source address as the public address of the source user-side network node 110a and a destination address as the public address of the content node.

Turning to FIG. 5B, a forward-link (FL) traffic flow 520 is indicated by a thick arrow, and the FL traffic flow 520 is assumed to correspond to the RL traffic flow 510 of FIG. 5A. As used herein, references to a FL flow and RL flow "corresponding" to each other is intended generally to indicate that the traffic in the two flows is part of a same communications transaction. For example, the RL flow 510 can be a request for content from a CPE device 117 to a content source on the content network 170, and the FL flow 520 can be some or all of the requested content being sent by the content source to the requesting CPE device 117. At a location labeled 'D' (i.e., where the packets of the FL traffic flow 520 are received at the provider-side network node 130 from the content network 170), each packet is labeled with a destination address as the public address of the destination user-side network node 110a and a source address as the public address of the source content node (i.e., the inverse of the labeling of the packets at location 'C' of FIG. 5A). In the provider-side network node 130, NAT 420 translates the destination network address from the public address of the user-side network node 110a to the private network address of the destination CPE device 117a. The tunneling module 422 encapsulates packets of the FL flow 520, identifying the tunneling module 421a in the user-side network node 110a of the destination CPE device 117a as the end point of a network tunnel the packets are to follow.

Accordingly, at a location labeled 'E' (i.e., a point where the packets of the FL traffic flow have passed through the NAT 420 and the tunneling module 422, contents of each packet include the following: the destination network address of the packet is the private network address of the destination CPE device 117a, the source network address of the packet is the network address of the content source on the content network 170, and the packet is encapsulated in a tunneling header that identifies the tunneling module 421a as the end point of the tunnel. The packets can be received by the FL flow identifier 445 in the provider-side network node 130, which can attempt to match the FL traffic flow 520 to a stored flow in the flow data store 450 (corresponding to some previously monitored RL traffic flow 510). In the illustrated example, the packet labeling at location 'E' can effectively be the inverse of the labeling of the packets at location 'B' of FIG. 5A, such that the labeling of the FL traffic flow 520 packets substantially corresponds to the entry in the flow data store 450 generated from the labeling of the corresponding RL traffic flow 510.

As described above, the entry in the flow data store 450 can include an indication of the device classification of the destination CPE device 117 (CPE device 117*a* in the illustrated case). As such, the provider-side shaper 435 can use the indicated device classification to determine an appropriate device shaping profile to apply to the FL traffic flow 520. For example, if CPE device 117*a* is a small-screen device, the provider-side shaper 435 can shape communication of the FL traffic flow 520 according to a small-screen shaping profile (e.g., and according to present link congestion and/or other factors). In some implementations, the provider-side shaper 435 receives device classification information as a message from the FL flow identifier 445. In other implementations, the FL flow identifier 445 can append the device classification indication to the packets of the FL traffic flow 520 prior to forwarding the packets to the provider-side shaper 435, and the provider-side shaper 435 can strip the device classification indication from the packets prior to forwarding the FL traffic flow 520 over the provider network 150. The device-shaped FL traffic flow 520 can be communicated via the virtual tunnel to the destination user-side network node 110*a*, and routed by the user-side network node 110*a* to the destination CPE device 117*a*. In some implementations, the provider-side shaper 435 can include the FL flow identifier 445 (e.g., they can be integrated into a single component).

Figure 6:
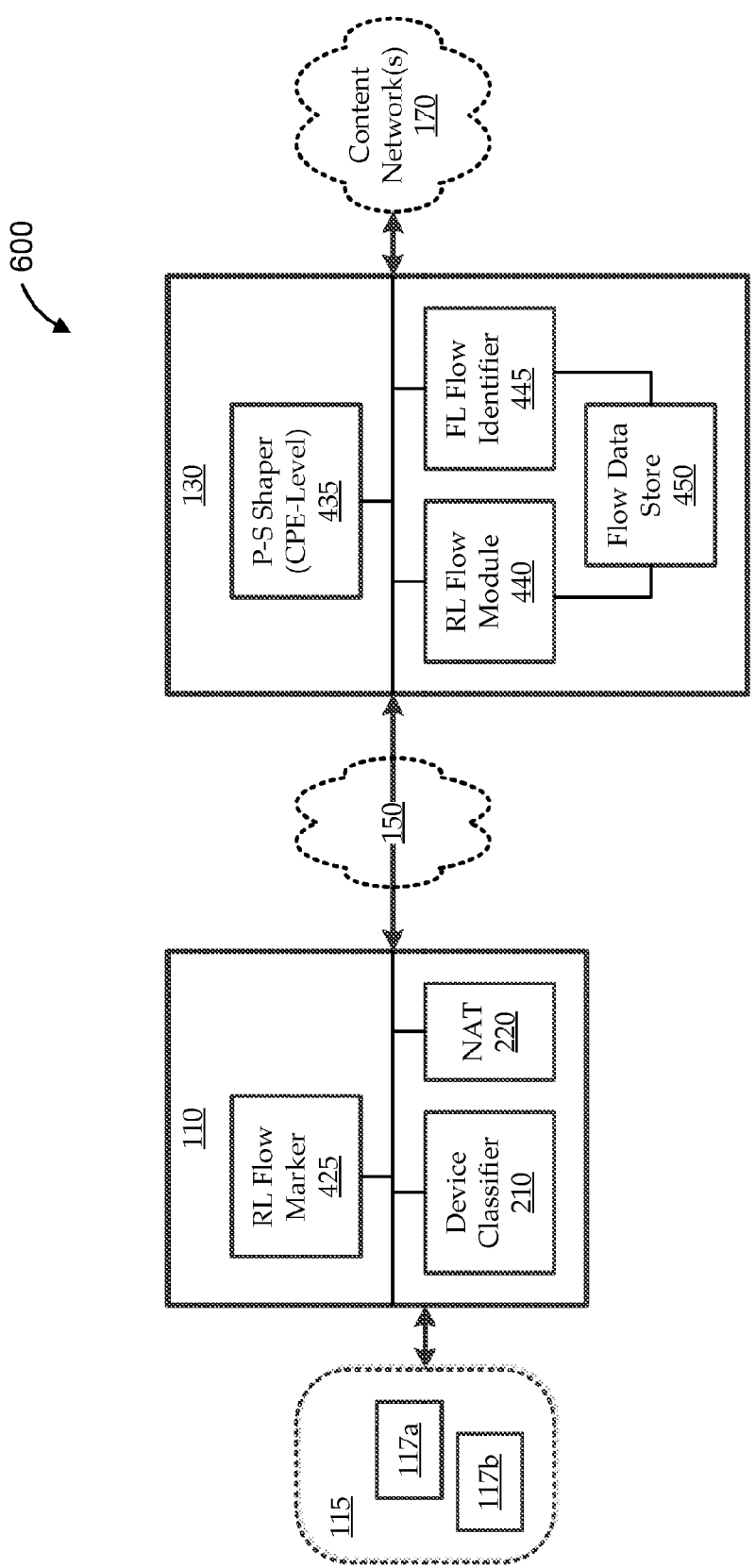
FIG. 6 shows an illustrative communications environment having an architecture in which device shaping functions are implemented in the provider-side network node, and network address translation functions are implemented in the user-side network nodes, according to various embodiments.

FIG. 6 shows an illustrative communications environment 600 having an architecture in which device shaping functions are implemented in the provider-side network node 130, and network address translation functions are implemented in the user-side network nodes 110, according to various embodiments. Similar to FIGS. 1, 2, and 4, the communications environment 600 includes a number of user-side network nodes 110 (only one is shown to avoid over-complicating the Figure) in communication with at least one provider-side network node 130 via a provider network 150, and the provider-side network node 130 can be in communication with various content services via one or more content network(s) 170. The user-side network node 110 is illustrated as implementing a local user network 115 having multiple CPE devices 117.

As in the architecture of FIG. 2, each user-side network node 110 includes a device classifier 210 and a NAT 220; and as in the architecture of FIG. 4, each user-side network node 110 includes a RL flow marker 425. Also as in the architecture of FIG. 4, the provider-side network node 130 includes a provider-side shaper 435, a FL flow identifier 445, a RL flow module 440, and a flow data store 450. In such an architecture, RL traffic flow marking can be used to help enable provider-side device shaping (e.g., as in FIG. 4), but additional techniques are implemented to overcome the provider-side network node's 130 lack of knowledge of the identity of the destination CPE devices 117 for FL traffic flows.

In an alternative embodiment, the NAT 420 can also include (or be in communication with another component that implements) dynamic host configuration protocol (DHCP) functionality. For example, in some embodiments (including some implementations operating in context of the architecture of FIG. 6), when a new CPE device 117 is detected by the user-side network node 110, a DHCP server at the user-side network node 110 assigns a private IP address to the detected CPE device 117. In the alternative embodiment, the DHCP server functions can be moved to the provider-side network node 130. For example, the DHCP functions can be in a configuration sometimes referred to as a carrier grade NAT (CGNAT). When a new CPE device 117 is detected at a user-side network node 110, a DHCP request message can be sent by the user-side network node 110 over the provider network 150 to the provider-side DHCP function in the provider-side network node 130, and the provider-side DHCP function can assign a private IP address to the newly detected CPE device 117. In some embodiments, the DHCP request can comprise a NAT port-range for the new CPE device 117. Regardless, the provider-side network node 130 can send a response message back to the user-side network node 110 with the assigned private IP address of the newly detected CPE device 117. The DHCP request and response messages can result in additional traffic being communicated over the provider network 150, as compared to other approaches described herein. As discussed above, the device classifier 210 in the user-side network node 110*a* classifies the newly detected device, and in some embodiments, the provider-side network node 130 can send a request to the user-side network node 110*a* for the classification of the newly detected CPE device 117*a*. For example, a device context function at the provider-side network node 130 can parse the DHCP request and response messages (e.g., which can include information relating to device MAC address, OUI, hostname, and other device-characteristics, as well as the assigned private IP addresses and NAT port range) and can query the device classifier 210 (or other component in communication with device classification listings) to obtain a classification for the detected CPE device 117. In this way, the provider-side network node 130 can develop a device classification assignment for each CPE device 117 indexed by device public address (e.g., the public IP address and a TCP/UDP NAT port range). Other traffic flow handling, including other aspects of the device shaping, can be handled in a manner that is similar, or identical, to other implementations described with reference to FIG. 5.

Figure 7A:
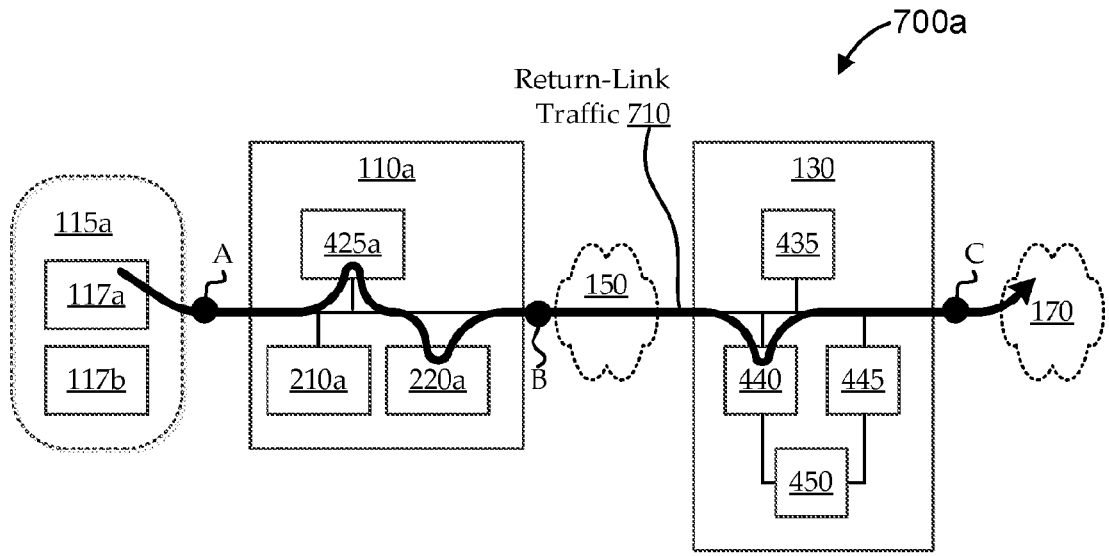
FIGS. 7A and 7B show illustrative device shaping in an architecture, like the communications environment of FIG. 6.
Figure 7B:
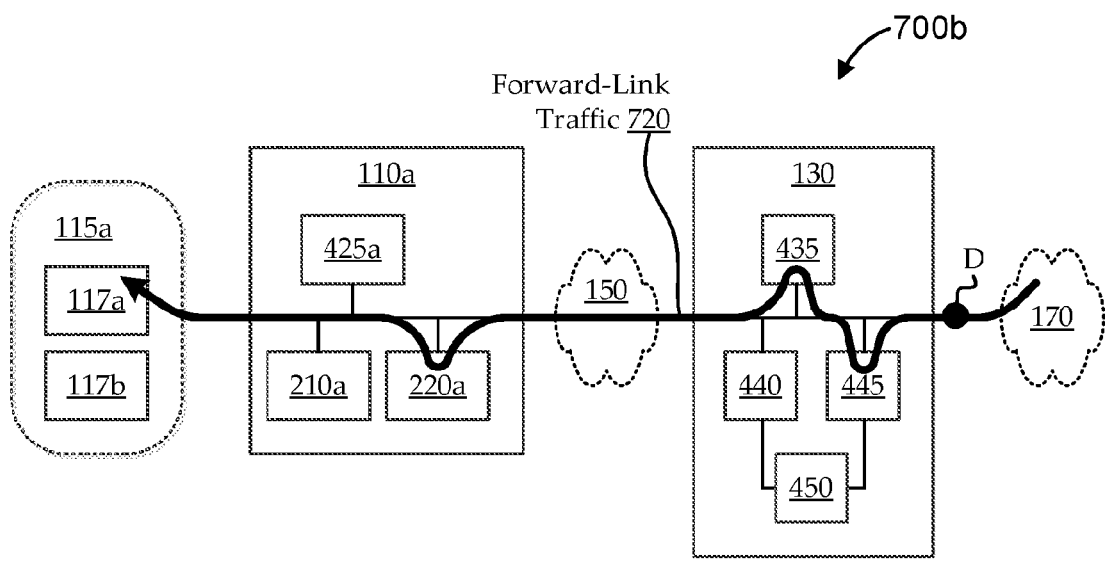

For added clarity, FIGS. 7A and 7B show illustrative device shaping in an architecture 700, like the communications environment 600 of FIG. 6. As in FIGS. 5A and B, return-link (RL) traffic is marked by the user-side network node 110 to enable device shaping of corresponding forward-link traffic by a provider-side shaper 435 in the provider-side network node 130. However, because the NAT 220 is in the user-side network node 110, the provider-side network node 130 is unaware of the identity of the destination CPE device 117 when forward-link traffic is received, such that other techniques (e.g., a combination of public address of the user-side network node 110*a* and TCP/UDP port is used to uniquely identify the CPE device 117) are involved in making device shaping determinations.

Turning first to FIG. 7A, a return-link (RL) traffic flow 710 is shown as a thick arrow. The RL traffic flow 710 begins at a source CPE device 117*a* and is destined for a content node or other destination in the content network 170. At a location labeled 'A', the packets of the RL traffic flow 710 can include header information identifying a source address as the private address (e.g., private IP address) of the CPE device 117*a*, and a destination address as the public address of the destination content node. It can be assumed that CPE device 117a has been classified by a device classifier 210, as described above.

The RL traffic flow 710 is received by the user-side network node 110a. A RL flow marker 425 in the user-side network node 110a marks packets of the RL traffic flow 710 with an identifier that indicates the device classification for CPE device 117a. The packets are then forwarded to the NAT 220a in the user-side network node 110a, which can translate the private address of the source CPE device 117a to the public address of the user-side network node 110a. Accordingly, at the location labeled 'B' (i.e., where the packets of the RL traffic flow 710 leave the user-side network node 110a destined for the provider-side network node 130), each packet can be associated with one or more identifiers that indicate a source address as the public address of the user-side network node 110a, a destination address as the public address of the content node, and a device type (e.g., an actual device type label, an index to a list of stored device types, etc.) of the originating CPE 117a.

The RL traffic flow 710 traverses the shared link of the provider network 150 and arrives at the provider-side network node 130. At the provider-side network node 130, a RL flow module 440 stores identification information for the RL traffic flow 710 in a flow data store 450. For example, the RL flow module 440 associates a RL flow identifier with the RL traffic flow 710, and the RL flow identifier is stored in the flow data store 450 in association with an indication of the device classification of CPE device 117a (from the packet labels). In some implementations of the RL flow identifier, the flow data store 450 has an entry for each flow that includes inverted source and destination addresses (i.e., for a forward-link flow corresponding to the stored RL traffic flow 710, the RL source (user-side network node 110a) will be the FL destination, and the RL destination (content node) will be the FL source), and an indication of the classification (e.g., type of the device) of the originating (for RL flows) and destination (for FL flows) CPE device 117a. In some implementations of the RL flow identifier in the flow data store 450, each entry also indicates a port (e.g., the RL source port corresponding to CPE device 117a can be the FL destination port). The packets of the RL traffic flow 710 can then be prepared for communication to the destination content node. In some embodiments, the RL flow module 440 strips the device classification from the packets. Accordingly, at the location labeled 'C' (i.e., where the packets of the RL traffic flow 710 leave the provider-side network node 130 destined for the content network 170), each packet is labeled with a source address as the public address of the source user-side network node 110a and a destination address as the public address of the content node (e.g., and a source port as the port corresponding to CPE device 117a). For example, the source and destination addresses can be appended to each packet as part of a 5-tuple or in any other suitable manner.

Turning to FIG. 7B, a forward-link (FL) traffic flow 720 is indicated by a thick arrow, and the FL traffic flow 720 is assumed to correspond to the RL traffic flow 710 of FIG. 7A. At a location labeled 'D' (i.e., where the packets of the FL traffic flow 720 are received at the provider-side network node 130 from the content network 170), each packet is labeled with a destination address as the public address of the destination user-side network node 110 and a source address as the public address of the source content node (i.e., the inverse of the labeling of the packets at location 'C' of FIG. 7A). The packets can also indicate a destination port (e.g., TCP/UDP port) corresponding to the port associated with the destination CPE device 117a. The packets can be received by the FL flow identifier 445 in the provider-side network node 130, which can attempt to match the FL traffic flow 720 to a stored flow in the flow data store 450 (corresponding to some previously monitored RL traffic flow 710). In the illustrated example, the packet labeling at location 'D' sufficiently corresponds to the inverse of the labeling of the packets at location 'B' of FIG. 7A, such that the FL traffic flow 720 can be matched to the entry in the flow data store 450 generated from the labeling of the corresponding RL traffic flow 710.

As described above, the entry in the flow data store 450 can include an indication of the device classification of the destination CPE device 117 (CPE device 117a in the illustrated case). As such, the provider-side shaper 435 can use the indicated device classification to determine an appropriate device shaping profile to apply to the FL traffic flow 720. For example, if CPE device 117a is a small-screen device, the provider-side shaper 435 can shape communication of the FL traffic flow 720 according to a small-screen shaping profile (e.g., and according to present link congestion and/or other factors). In some implementations, the provider-side shaper 435 receives device classification information as a message from the FL flow identifier 445. In other implementations, the FL flow identifier 445 can append the device classification indication to the packets of the FL traffic flow 720 prior to forwarding the packets to the provider-side shaper 435, and the provider-side shaper 435 can strip the device classification indication from the packets prior to forwarding the FL traffic flow 720 over the provider network 150. The device-shaped FL traffic flow 720 can be communicated via the provider network 150 to the destination user-side network node 110. The packets of the FL traffic flow 520 are received by the NAT 220a at the user-side network node 110a, which translates the public destination address and port to the private destination address of the CPE device 117a. The packets can be routed to CPE device 117a, accordingly.

Components of the various embodiments described above in FIGS. 1-7B can be implemented in any suitable manner. In some implementations, components are implemented as hardware state machines that perform various functions using circuits, such as programmable circuits, processors, etc. In other implementations, some functions are implemented in hardware, software, firmware, or any combination thereof. If implemented in software or firmware, the functions can be stored as one or more instructions on a non-transitory computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer.

Figure 8:
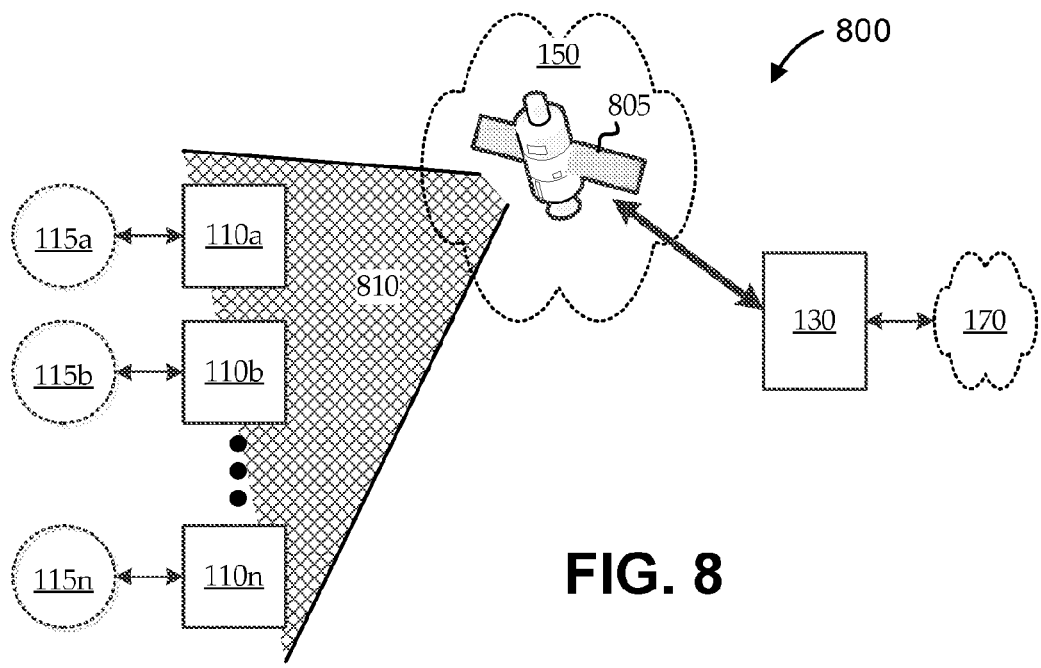
FIG. 8 shows an illustrative satellite communications system for implementing various embodiments described herein.

The various embodiments described above can be implemented in context of any suitable types of communications systems. As one example, FIG. 8 shows an illustrative satellite communications system 800 for implementing various embodiments described herein. As illustrated, the provider network 150 is implemented as a satellite communications system having one or more satellites 805 that illuminate one or more user-side network node coverage areas with one or more spot beams 810. Each spot beam 810 can be allocated a certain amount of bandwidth (e.g., a fixed or dynamic amount), such that multiple user-side network nodes 110 in the spot beam can share the bandwidth resources of the spot beam 810. As described herein, device shaping can be used to dynamically allocate the shared resources of the spot beam 810 among some or all of the user-side network nodes 110 in its coverage area.

Figure 9:
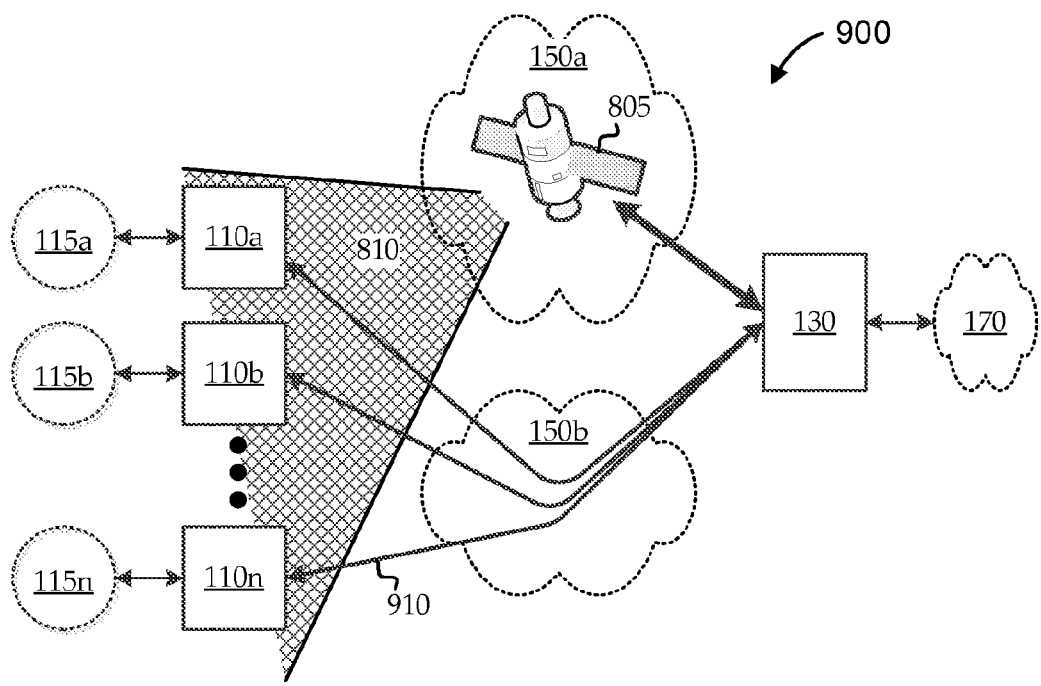
FIG. 9 shows an illustrative hybrid communications system for implementing various embodiments described herein.

As another example, FIG. 9 shows an illustrative hybrid communications system 900 for implementing various embodiments described herein. The provider network 150 can be implemented as a hybrid system having multiple communications systems (only two are shown to avoid over-complicating the illustration), such as a higher-throughput, higher-latency provider subnetwork 150a, and a lower-throughput, lower-latency provider subnetwork 150b (e.g., a terrestrial communications system). Other examples of subnetwork 150b satellite networks comprising satellites at lower orbits than satellites of the subnetwork network 150a. For example, if the satellites of subnetwork 150a are GEO satellites, subnetwork 150b can comprise medium earth orbit (MEO) satellites or low earth orbit (LEO) satellites. As illustrated, one provider subnetwork 150a can be a satellite communications system having one or more satellites 805 that illuminate one or more user-side network node coverage areas with one or more spot beams 810 (e.g., as in FIG. 8), and another provider subnetwork 150b can be a terrestrial communications system having one or more shared terrestrial links 910 (e.g., cellular links, etc.). In such embodiments, the device shaping can include (or can be in addition to) determining over which of the multiple provider subnetworks to send particular traffic. For example, streaming video traffic may be routed over the satellite network by default, but the traffic can be rerouted (e.g., temporarily) to the terrestrial network in response to a congestion condition. In such an example, device shaping can be used to shape only the traffic being routed over the satellite network, only the traffic being routed over the terrestrial network, over both, etc.

Figure 10:
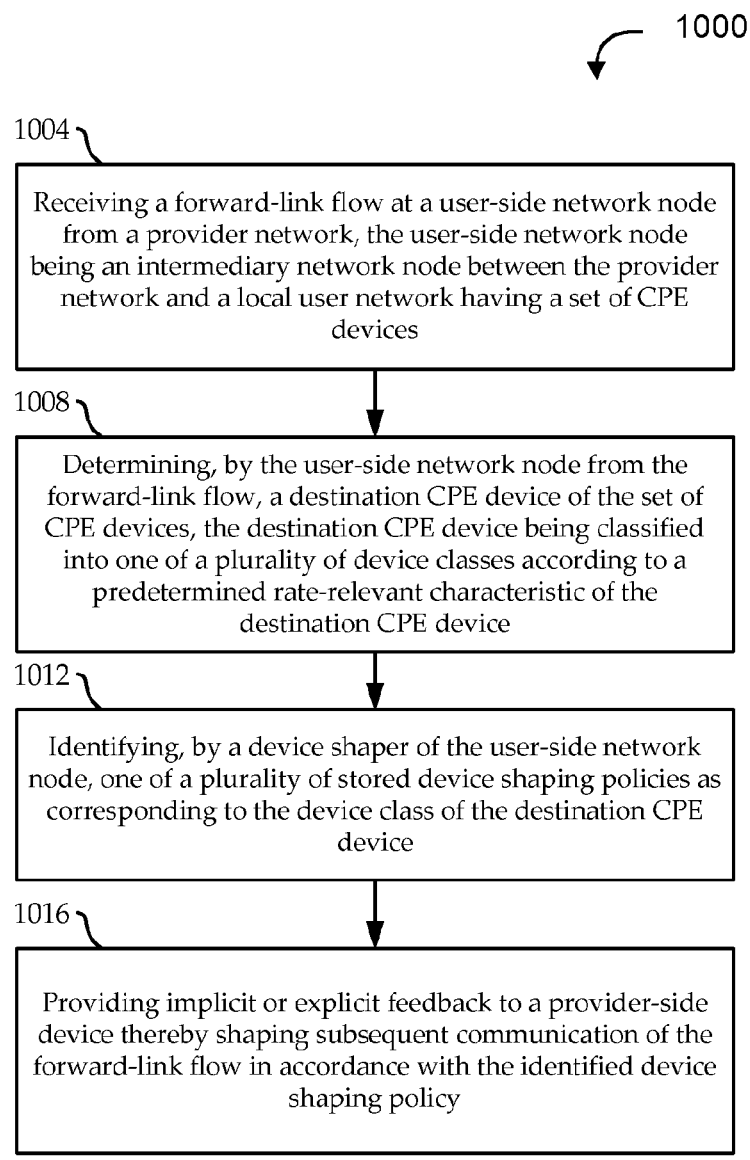
FIGS. 10 and 11 show illustrative flow diagrams of methods for device shaping, according to various embodiments.

FIG. 10 illustrates an example of operation of the embodiment illustrated in FIGS. 2-3B. The following description is intended to be in accordance with the descriptions of FIGS. 2-3B above. Any discrepancy should be seen as a further discussion and elaboration of examples or alternative examples of possible operations and capabilities of the communications environment 200/300a/300b.

At stage 1004, the user-side network node 110 receives a first set of one or more packets of a FL traffic flow 310 as shown in FIG. 3A. As noted, each packet can have as its network (e.g., IP) destination address the public network address of the user-side network node 110, which the NAT 220 can translate to the private network address of the destination CPE device 117a, which in the example illustrated in FIG. 3A, is CPE device 117a. As noted, prior to receiving the FL traffic flow 310, the device classifier 210 can have classified each of the CPE devices 117a and 117b of the user local network 115 behind the user-side network node 110, and stored (e.g., in a look up table) an identification of each CPE 117 (e.g., by its private network address) in association with the CPE's classification. For example, as discussed above, the classification of each CPE device 117a can have been in accordance with a rate-relevant characteristic of the device. At stage 1008, the FL flow identifier 225 determines from the CPE classification table the classification of the destination CPE device 117a. At stage 1012, the U-S Shaper (CPE-Level) 215 identifies a predetermined shaping policy that corresponds to the classification of the destination CPE device 117a. For example, if the destination CPE device 117a is classified as a small-screen device, the shaping policy may indicate a relatively low bit-rate at which video data can be displayed on the CPE device 117a without adversely affecting the user's QoE. At stage 1016, assuming the FL traffic 310 comprises adaptive bit-rate traffic, the U-S Shaper (CPE-Level) 215 takes action to provide feedback (e.g., feedback 320 illustrated in FIG. 3B) to the provider-side network node 130 or the source of the FL traffic flow 310 that implements the shaping policy identified at stage 1012. In some embodiments, the feedback 320 is explicit: for example, one or more device shaping instructions to a traffic shaper (e.g., P-S (UT-Level) 235 in the provider-side network node 130. In other embodiments, the feedback 320 is implicit. For example, the feedback 320 comprises a traffic constraint provided to the source of the FL traffic 310. As discussed above, an example of such an implicit constraint can be dropping packets of the FL traffic flow 310 at the user-side network node 110 until the source of the FL traffic flow sends packets at a bit rate that corresponds to the shaping policy identified at stage 1012. Alternatively, the constraint can comprise sending from the user-side network node 110 NACK responses to the packets of the FL traffic flow 310 until the source of the FL traffic flow sends packets at a bit rate that corresponds to the shaping policy identified at stage 1012.

Figure 11:
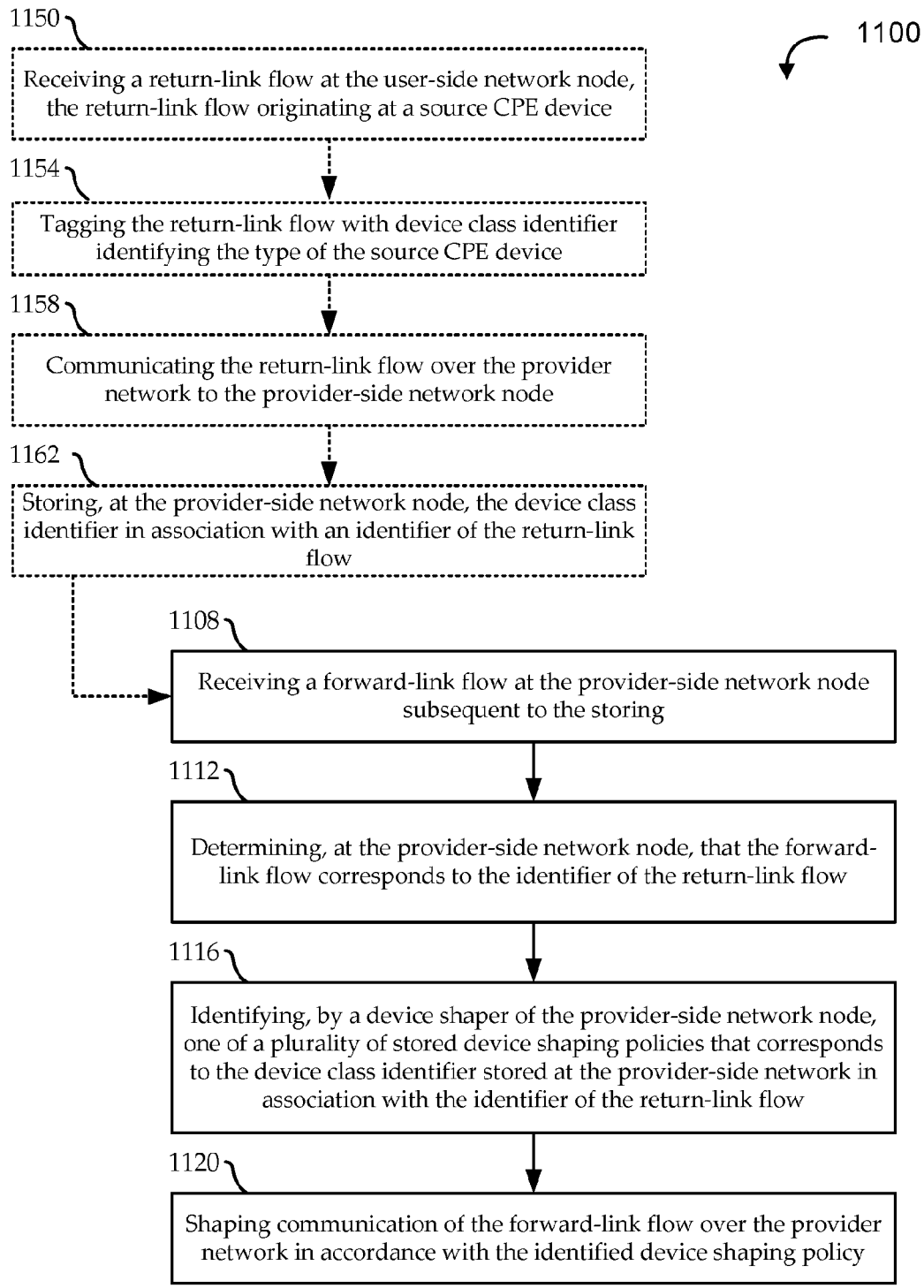

FIG. 11 illustrates an example of operation of the embodiments illustrated in FIGS. 4-7B. The following description is intended to be in accordance with the descriptions of FIGS. 4-7B above. Any discrepancy should be seen as a further discussion and elaboration of examples or alternative examples of possible operations and capabilities of the communications environment 400/500a/500b/600/700a/700b.

At stage 1150, packets of a RL traffic flow such as 510 in FIG. 5A or 710 in FIG. 7A from a CPE device 117a are received at a user-side network node 110a. (Hereinafter, such a RL traffic flow is referred to as 510/710.) The network (e.g., IP) source address is the private network address of the originating CPE 117a. The device classifier 210a would have classified each of the CPE device 117a and 117b behind the user-side network node 110a and stored (e.g., in a look up table) an identification (e.g., the private network address) of each CPE device with the classification (e.g., device type) of the CPE device. Classification of CPE devices 117 is discussed above and examples of techniques for classifying CPE devices 117 are illustrated in FIG. 12. Utilizing the prior classifications of the CPE devices 117, the RL-flow marker 425a identifies the type of the originating CPE device 117a and, at stage 1154, marks (e.g., tags) packets of the RL flow 510/710 with the type of the originating CPE device 117a. For example, if the type of the CPE device 117a is "small screen," the RL-flow marker 425a will set a field, flag, or the like in the packets indicating that the originating CPE device 117a is a small-screen type device.

At stage 1158, the user-side network node 110a sends the packets of the RL flow 510/710 over the provider network(s) 1150 to the provider-side network node 130.

As discussed above, in the embodiment illustrated in FIGS. 4-5B, a unique network tunnel is provided from each user-side network node 110 to the provider-side network node 130, and packets of the RL flow 510 are communicated from the user-side network node 110a to the provider-side network node 130 at stage 1150 via the user-side network node's 110a unique tunnel. Because NAT 420 and tunneling module 422 are upstream from the provider-side network node's 130 connection to the provider network(s) 150, the packets of RL flow 510 arrive at the provider-side network node 130 with an identification of the unique tunnel from the user-side network node 110a, and the source network address is the private network address of the originating CPE device 117a.

In the embodiment illustrates in FIGS. 6-7B, the NAT 220a in the user-side network node 110a translates the private network address of the originating CPE 117a to the public network address of the user-side network node 110a. Consequently, packets of the RL flow 710 arrive at the provider-side network node 130 with a source network address of the public network address of the user-side network node 110a and a source port number that corresponds to the originating CPE 117a.

In both embodiments illustrated in FIGS. 4-7B, the provider-side network node 130 receives the packets of flow 510/710 communicated at stage 1158, and at stage 1162, the RL flow module 440 in the provider-side network node 130 stores in the flow data store 450 the type (e.g., as tagged at stage 1154) of the originating CPE device 117a with an identifier that identifies the RL flow 510/710. As is known, a packet typically includes a 5-tuple, which can comprise the source network address and port of the packet, the destination network address and port of the packet, and the network addressing protocol of the packet.

In the embodiment of FIGS. 4-5B, the identifier of the RL flow 510 stored at stage 1162 can comprise the private network address of the originating CPE 117a from the 5-tuple and an identifier of the unique tunnel (corresponding to the user-side network node 110a) through which the RL flow 510 was received. The identifier can alternatively or further comprise the network address and port number of the destination node of the packets of the RL flow 510. In some embodiments, the identifier source and destination network address and ports can be inverted in the flow data store 450.

In the embodiment of FIGS. 6-7B, the identifier of the RL flow 710 stored at stage 1162 can comprise the public network address of the user-side network node 110a and the port number that corresponds to the originating CPE 117a from the 5-tuple of the packets. The identifier can alternatively or further comprise the network address and port number of the destination node of the packets of the RL flow 710. In some embodiments, the identifier source and destination network address and ports can be inverted in the flow data store 450.

Stages 1150-1162 can be repeated for multiple RL traffic flows (e.g., similar to flows 510 and 710) each originating from a CPE device 117 behind one of the user-side network nodes 110 connected to the provider-side network node 130. This can result in multiple entries in the flow data store 450 each comprising an identifier identifying a RL flow and an indication of the type of the CPE device 117 that originated the RL flow.

At stage 1108, a FL traffic flow 520 (as in FIG. 5B) or 720 (as in FIG. 7B) is received at the provider-side network node 130. Such FL traffic flows 520/720 can be in response to one of the RL traffic flows 510/710 stored in the flow data store 450. At stage 1112, the FL flow identifier 445 determines whether the FL flow 520/720 corresponds (e.g., is a response) to a RL traffic flow whose identifier is stored at the flow data store 450. It does so by comparing an attribute of the FL flow 520/720 to similar attributes of identifiers of RL flows stored in the flow data store 450. For example, in embodiments in which RL flow identifiers in the flow data store 450 comprise all or part of the 5-tuple of a RL flow, the FL flow identifier 445 attempts to find in the flow data store 450 a 5-tuple (or part thereof) that corresponds to the 5-tuple (or part thereof) of packets of the FL flow 520/720. The 5-tuple of a FL flow 520/720 that corresponds to a RF flow (e.g., 510) presumably is the same as the corresponding RF flow except that the destination and source network addresses and port numbers are inverted. Having identifying an RF flow in the flow data store 450 that corresponds to the FL flow 520/720, the FL flow identifier 445 identifies the type of the destination CPE device 117a stored in the flow data store 450. The FL flow identifier 445 then provides the destination CPE device type to the device-level shaper 435. For example, the FL flow identifier 445 can mark the packets of the FL flow 520/720 with the type of the destination CPE device. As another example, the FL flow identifier 445 can signal the device-level shaper 435 the device type.

As noted, in the embodiment illustrated in FIGS. 5A and 5B, the RL flow identifiers stored in the flow data store 450 can comprise, for each RL flow, an identification of the tunnel over which the RL flow was received at the provider-side network node 130 and the private network address of the CPE device 117a that originated the RL flow. The tunnel uniquely identifies the user-side network node 110a from the other provider-side network nodes 110 connected to the provider-side network node 130, and the private network address of the CPE device 117a identifies the originating CPE device. Note that, because RL flows (e.g., 510) are NATed by 420 and de-tunneled by 422 after processing by the RL flow module 440, the tunnel identifier and private network address of the originating CPE device 117a are available in the packets of the RL flow 510 arriving at the RL flow module 440.

In the embodiment illustrated in FIGS. 7A and 7B, the RL flow identifiers stored in the flow data store 450 can comprise, for each RL flow, the public network address of the user-side network node 110a and the port number of the originating CPE device 117a both of which are part of the 5-tuple of the packets of the RL flow. Because RL flows (e.g., 710) are NATed by 220a prior to processing by the RL flow module 440, the 5-tuples of the packets of the RL flow 710 arriving at the RL flow module 440 comprise as the source address the public network address of the user-side network node 110a and a port number that corresponds to the originating CPE device 117a.

As noted above, the flow data store 450 includes a type of the destination CPE device 117a stored in association with the RL flow identifier determined at stage 1112. At stage 1116, the P-S shaper (CPE level) 435 identifies a pre-stored shaping policy that corresponds to that CPE type and, at stage 1120, shapes the FL flow 520/720 in accordance with the identified shaping policy.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for device shaping traffic in a communications network, the method comprising:
   receiving a forward-link flow at a user-side network node from a provider network, the user-side network node being an intermediary network node between the provider network and a local user network having a set of customer premises equipment (CPE) devices;
   determining, by the user-side network node from the forward-link flow, a destination CPE device of the set of CPE devices, the destination CPE device being classified into one of a plurality of device classes according to a predetermined rate-relevant characteristic of the destination CPE device;
   identifying, by a device shaper of the user-side network node, one of a plurality of stored device shaping policies as corresponding to the device class of the destination CPE device, the identified device shaping policy indicating a target data rate; and
   feeding back an indication of the identified device shaping policy from the user-side network node over the provider network by generating a traffic constraint by the device shaper in the user-side network node by iteratively dropping packets of the forward-link flow until the content provider is caused to adapt communication of the forward-link flow to the target data rate in accordance with the identified device shaping policy, thereby shaping subsequent communication of the forward-link flow in accordance with the identified device shaping policy.

2. The method of claim 1, further comprising:
   classifying the set of CPE devices into respective ones of the plurality of device classes by a device classifier in communication with the user-side network node according to respective predetermined rate-relevant characteristics of the set of CPE devices.

3. The method of claim 1, wherein the feeding back comprises:
   communicating a device shaping instruction from the device shaper to a provider-side shaper in a provider-side network node via the provider network, the device shaping instruction generated in accordance with the identified device shaping policy, thereby adapting communication of the forward-link flow by the provider-side shaper in response to the device shaping instruction.

4. The method of claim 1, wherein:
the forward-link flow comprises packets indicating a destination address that is a public network address of the user-side network node; and
determining the destination CPE device comprises translating the public network address to a private network address of the CPE device using a network address translator (NAT) of the user-side network node.

5. The method of claim 1, wherein the rate-relevant characteristic corresponds to a screen fidelity of the destination CPE device.

6. The method of claim 1, further comprising:
detecting that the forward-link flow comprises adaptive traffic,
wherein the identifying and the feeding back are in response to the detecting.

7. A method for device shaping traffic in a communications network, the method comprising:
receiving a return-link flow at a user-side network node, the return-link flow originating at a source customer premises equipment (CPE) device;
tagging the return-link flow with a device class identifier and with a tunnel identifier that identifies one of a plurality of virtual tunnels, each providing a virtual connection between a provider-side network node and a respective one of a plurality of user-side network nodes via the communications network;
communicating the return-link flow over a provider network to the provider-side network node, the provider-side network node comprising a network address translator (NAT);
storing, at the provider-side network node, the device class identifier in association with a flow identifier of the return-link flow received by the provider-side network node over the provider network, the return-link flow previously tagged with the device class identifier by the user-side network node to indicate one of a plurality of device classes into which the source CPE device of the return-link flow was previously classified according to a predetermined rate-relevant characteristic of the source CPE device;
storing, at the provider-side network node, the tunnel identifier at the provider-side network node in association with the flow identifier;
receiving a forward-link flow at the provider-side network node subsequent to the storing, the forward-link flow indicating a public destination address;
determining, at the provider-side network node, that the forward-link flow corresponds to the return-link flow according to the stored flow identifier and the tunnel identifier by translating the public destination address to a destination tunnel identifier using the NAT and by matching the destination tunnel identifier to the stored tunnel identifier associated with the return-link flow;
identifying, by a device shaper of the provider-side network node, one of a plurality of stored device shaping policies as corresponding to the one of a plurality of device classes of the source CPE device according to the stored device class identifier; and shaping communication of the forward-link flow over the provider network in accordance with the identified device shaping policy.

8. A communications system comprising:
a user-side network node comprising:
a user network interface comprising a plurality of user network ports to provide connectivity with a local user network comprising a set of consumer premises equipment (CPE) devices;
a provider network interface comprising a provider network port to provide connectivity over a provider network; and
a forward-link flow identifier coupled with the provider network interface that operates to determine a destination CPE device from a forward-link flow received over the provider network;
a data store having, stored thereon, a plurality of device shaping policies; and
a device shaper coupled with the forward-link flow identifier and the data store to:
identify one of the plurality of device shaping policies as corresponding to a device class of the destination CPE device, the destination CPE device being one of the set of CPE devices and being previously classified into the device class according to a predetermined rate-relevant characteristic of the destination CPE device, the identified device shaping policy indicating a target data rate; and
feedback an indication of the identified device shaping policy over the provider network by generating a traffic constraint detectable by a content provider by iteratively dropping packets of the forward-link flow until the content provider is caused to adapt communication of the forward-link flow to the target data rate in accordance with the identified device shaping policy, thereby shaping subsequent communication of the forward-link flow in accordance with the identified device shaping policy.

9. The communications system of claim 8, further comprising:
a device classifier in communication with the user-side network node that operates to classify the set of CPE devices into respective ones of the plurality of device classes according to respective predetermined rate-relevant characteristics of the set of CPE devices.

10. The communications system of claim 8, further comprising:
a provider-side network node in communication with the user-side network node over the provider network, the provider-side network node comprising a provider-side shaper,
wherein the indication is received by the provider-side shaper via the provider network as a device shaping instruction generated in accordance with the identified device shaping policy, thereby causing the provider-side shaper to adapt subsequent communication of the forward-link flow over the provider network in response to the device shaping instruction.

11. A communications system comprising:
a provider-side network node comprising:
a content network interface comprising a content network port to provide connectivity with a plurality of content sources via a content network;

a provider network interface comprising a provider network port to provide connectivity with a plurality of user-side network nodes over a provider network;

a flow data store that operates to store, in response to receiving a return-link flow via the provider network, a device class identifier in association with a flow identifier of the return-link flow, the return-link flow previously tagged with the device class identifier by a user-side network node to indicate one of a plurality of device classes into which a source customer premises equipment (CPE) device of the return-link flow was previously classified according to a predetermined rate-relevant characteristic of the source CPE device;

a forward-link flow identifier coupled with the provider network interface that operates to determine that a forward-link flow received via the content network corresponds to the return-link flow according to the stored flow identifier; and a device shaper coupled with the forward-link flow identifier and the flow data store to:
identify one of a plurality of stored device shaping policies as corresponding to the one of a plurality of device classes of the source CPE device according to the stored device class identifier; and
shape communication of the forward-link flow over the provider network in accordance with the identified device shaping policy; and a user-side network node in communication with the provider-side network node over the provider network, the user-side network node comprising a return-link flow marker that operates to tag the return-link flow with the device class identifier in response to receiving the return-link flow from the source CPE device and prior to the return-link flow being communicated over the provider network to the provider-side network node.

12. A method for device shaping traffic in a communications network, the method comprising:

detecting a presence of a source customer premises equipment (CPE) device in a local user network;

classifying the source CPE device into one of a plurality of device classes according to a predetermined rate-relevant characteristic of the source CPE device in response to detecting the presence of the source CPE device;

receiving a return-link flow at a user-side network node, the return-link flow originating at the source CPE device;

tagging the return-link flow with a device class identifier;

communicating the return-link flow over a provider network to a provider-side network node;

storing, at the provider-side network node, the device class identifier in association with a flow identifier of the return-link flow received by the provider-side network node over the provider network, the return-link flow previously tagged with the device class identifier by the user-side network node to indicate one of the plurality of device classes into which the source CPE device of the return-link flow was previously classified;

receiving a forward-link flow at the provider-side network node subsequent to the storing;

determining, at the provider-side network node, that the forward-link flow corresponds to the return-link flow according to the stored flow identifier;

identifying, by a device shaper of the provider-side network node, one of a plurality of stored device shaping policies as corresponding to the one of a plurality of device classes of the source CPE device according to the stored device class identifier; and shaping communication of the forward-link flow over the provider network in accordance with the identified device shaping policy.

13. A method for device shaping traffic in a communications network, the method comprising:

receiving a return-link flow at a user-side network node, the return-link flow originating at a source customer premises equipment (CPE) device, the source CPE device being one of a set of CPE devices of a local user network, the user-side network node being an intermediary network node between the local user network and a provider network and being uniquely addressable by the provider-side network node over the provider network according to a public network identifier, each of the set of CPE devices being uniquely addressable by the user-side network node over the local user network according to a respective private network identifier and not uniquely addressable by the provider-side network node over the provider network;

tagging the return-link flow with a device class identifier by determining the respective private network identifier of the source CPE device, the device class identifier indicating the respective private network identifier of the source CPE device;

communicating the return-link flow over the provider network to a provider-side network node;

storing, at the provider-side network node, the device class identifier in association with a flow identifier of the return-link flow received by the provider-side network node over the provider network, the return-link flow previously tagged with the device class identifier by the user-side network node to indicate one of a plurality of device classes into which the source CPE device of the return-link flow was previously classified according to a predetermined rate-relevant characteristic of the source CPE device;

receiving a forward-link flow at the provider-side network node subsequent to the storing;

determining, at the provider-side network node, that the forward-link flow corresponds to the return-link flow according to the stored flow identifier;

identifying, by a device shaper of the provider-side network node, one of a plurality of stored device shaping policies as corresponding to the one of a plurality of device classes of the source CPE device according to the stored device class identifier; and shaping communication of the forward-link flow over the provider network in accordance with the identified device shaping policy.

14. The method of claim 13, wherein:

the user-side network node comprises a network address translator (NAT); and the shaping comprises communicating the forward-link flow according to the public network identifier of the user-side network node, wherein the public network identifier is translated to the respective private network identifier of the source CPE by the NAT when received by the user-side network node over the provider network.

15. A method for device shaping traffic in a communications network, the method comprising:

storing, at a provider-side network node, a device class identifier in association with a flow identifier of a return-link flow received by the provider-side network node over a provider network, the return-link flow previously tagged with the device class identifier by a user-side network node to indicate one of a plurality of device classes into which a source customer premises equipment (CPE) device of the return-link flow was previously classified according to a predetermined rate-relevant characteristic of the source CPE device;

receiving, at the provider-side network node, a forward-link flow subsequent to the storing;

determining, at the provider-side network node, that the forward-link flow corresponds to the return-link flow according to the stored flow identifier;

identifying, by a device shaper of the provider-side network node, one of a plurality of stored device shaping policies as corresponding to the one of a plurality of device classes of the source CPE device according to the stored device class identifier;

shaping communication of the forward-link flow over the provider network in accordance with the identified device shaping policy;

receiving, at the provider-side network node, a request for a private network address for a CPE device newly connected to the user-side network node; and sending, from the provider-side network node, the private network address for the newly connected CPE device.

16. The method of claim 15, wherein the request for a private network address comprises a port range for the newly connected CPE device.

17. The method of claim 16 further comprising:

sending from the provider-side network node a request for a classification of the newly connected CPE device; and storing at the provider-side network node a classification of the newly connected CPE device received from a device classifier in the user-side network node.

* * * * *